United States Patent [19]
Carter et al.

[11] Patent Number: 6,003,123
[45] Date of Patent: Dec. 14, 1999

[54] MEMORY SYSTEM WITH GLOBAL ADDRESS TRANSLATION

[75] Inventors: Nicholas P. Carter, Somerville; Stephen W. Keckler, Cambridge; William J. Dally, Framingham, all of Mass.

[73] Assignee: Massachusetts Institute of Technology, Cambridge, Mass.

[21] Appl. No.: 09/021,658

[22] Filed: Feb. 10, 1998

Related U.S. Application Data

[62] Division of application No. 08/314,013, Sep. 28, 1994, Pat. No. 5,845,331.

[51] Int. Cl.[6] .................................................. G06F 12/10
[52] U.S. Cl. ............................................ 711/207; 711/207
[58] Field of Search .................................... 711/147, 202, 711/203, 206, 207, 209

[56] References Cited

U.S. PATENT DOCUMENTS

| | | | |
|---|---|---|---|
| 4,241,396 | 12/1980 | Mitchell et al. | 364/200 |
| 4,408,274 | 10/1983 | Wheatley et al. | 364/200 |
| 5,075,842 | 12/1991 | Lai | 395/479 |
| 5,251,308 | 10/1993 | Frank et al. | 395/425 |
| 5,404,478 | 4/1995 | Arai et al. | 395/416 |
| 5,465,337 | 11/1995 | Kong | 395/417 |

OTHER PUBLICATIONS

Carter, Nicholas P., et al., "Hardware Support For Fast Capability–based Addressing," Proceedings of the 6th International Conference on Architectural Support for Programming Languages and Operating Systems (ASPLOS VI), Oct. 5–7, 1994, pp. 1–9.

Tyner, Paul, "APX 432 General Data Processor Architecture Reference Manual, Chapter 3, Objects for Program Environments," Intel Corporation, Jan. 1981, pp. 3–1 to 3–37.

Fabry, R.S., "Capability–Based Addressing," Fourth ACM Symposium on Operating Systems Principles, IBM Thomas J. Watson Research Center, Yorktown Heights, NY, October 15–17, 1973, pp. 413–412.

Dally, William J. et al., "An Object Oriented Architecture, "IEEE, 0149–7111/85/0000/0154, 1985, pp. 154–161.

Goodman, James R. et al., "The Wisconsin Multicube: A New Large Scale Cache–Coherent Multiprocessor," IEEE, CH2545–2/88/0000/0422, 1988, pp. 422–431.

Dally, William J, et al., "M–Machine Architecture v1.0 MIT Concurrent VLSI Architecture Memo 58," Massachusetts Institute of Technology, Artificial Intelligence Laboratory, Aug. 24, 1994, pp. 1–50.

*Primary Examiner*—Eddie P. Chan
*Assistant Examiner*—Kevin Verbrugge
*Attorney, Agent, or Firm*—Hamilton, Brook, Smith & Reynolds, P.C.

[57] ABSTRACT

A multiprocessor system having shared memory uses guarded pointers to identify protected segments of memory and permitted access to a location specified by the guarded pointer. Modification of pointers is restricted by the hardware system to limit access to memory segments and to limit operations which can be performed within the memory segments. Global address translation is based on grouping of pages which may be stored across multiple nodes. The page groups are identified in the global translation of each node and, with the virtual address, identify a node in which data is stored. Pages are subdivided into blocks and block status flags are stored for each page. The block status flags indicate whether a memory location may be read or written into at a particular node and indicate to a home node whether a remote node has written new data into a location.

12 Claims, 17 Drawing Sheets

Block Status Bits for Translated Address

MEMORY SYSTEM WITH GLOBAL ADDRESS TRANSLATION

RELATED APPLICATION

This application is a divisional of Ser. No. 08/314,013, filed Sep. 28, 1994, now U.S. Pat. No. 5,845,331, Dec. 1, 1998 the entire teachings of which are incorporated herein by reference.

GOVERNMENT SUPPORT

The invention was supported, in whole or in part, by a grant Contract No. F19628-92-C-0045 from the Air Force Electronic Systems Division. The Government has certain rights in the invention.

BACKGROUND OF THE INVENTION

In most computer systems, individual programs access code and data by addressing memory through a virtual address space. That virtual address space for each program must then be translated into the physical address space in which the code and data is actually stored in memory. Thus, distinct programs may use identical virtual addresses which translate to different locations in physical memory. The physical address space utilized by several programs may be completely distinct or they may overlap. Some level of security must be provided in order to permit common access to certain memory locations while protecting against unauthorized access to other locations.

Memory system designers must provide security without sacrificing efficiency and flexibility. One process' objects must be protected from modification by other, unauthorized processes, and user programs must not be allowed to affect the execution of trusted system programs. It must be possible to share data between processes in a manner that restricts data access to authorized processes; merely providing the ability to have data be private to a process or accessible to all processes is insufficient. An efficient mechanism must also be provided to change protection domains (the set of objects that can be referenced) when entering a subsystem.

The current trend towards the use of multithreading as a method of increasing the utilization of execution units make traditional security schemes undesirable, particularly if context switches may occur on a cycle-by-cycle basis. Traditional security systems have a non-zero context switch time as loading the protection domain for the new context may require installing new address translations or protection table entries.

A number of multithreaded systems such as Alewife (Agarwal, A., et al., "The MIT Alewife machine: A large-scale distributed-memory mutiprocessor," *Scalable Shared Memory Multiprocessors,* Kluwer Academic Publishers, 1991.), and Tera (Alverson, R., et al., "The tera computer system," *Proceedings of the* 1990 *International Conference on Supercomputing,* September, 1990, ACM SIGPLAN Computer Architecture News, pp 1–6) have avoided this problem by requiring that all threads which are simultaneously loaded share the same address space and protection domain. This may be sufficient for execution of threads from a single user program, but disallows interleaving threads from different protection domains, which may restrict the performance of the machine.

SUMMARY OF THE INVENTION

The present invention relates to several aspects of a memory system which may be used independently or together. The invention is particularly applicable in a virtual addressing, multiprocessor environment which requires sharing of data among multiple tasks across multiple nodes.

In accordance with one aspect of the invention, a data processing system comprises shared memory for storing instructions and data for plural programs, the shared memory being accessed in response to pointers. Guarded pointers address memory locations to which access is restricted. Each guarded pointer is a processor word which fully identifies a protected segment in memory and an address within the protected segment. Processor hardware distinguishes guarded pointers from other words and is operable under program control to modify guarded pointers. Modification of guarded pointers is restricted so that only addresses within the identified segment can be created. Thus, access outside of a protected segment is prevented. A permission field in the guarded pointer indicates permissible access to the identified memory segment such as read only or read/write. By providing the full virtual address, segment information, and a permission field, segment checks and permission checks can be performed during a memory access without requiring additional machine cycles.

Preferably, each guarded pointer comprises a length field and an address field. The value in the length field indicates a division of the address field into a segment subfield which identifies a segment location and an offset subfield which identifies an offset within an identified segment. The value in the length field is preferably logarithmically encoded using a base 2 logarithm. A tag field may be provided to identify the word as a guarded pointer, and the pointer must be so identified if it is to be used to access a memory location. By limiting the ability to set the flag bit and to freely modify addresses in pointers to the operating system, the creation of forged pointers by application programs to gain access to protected segments is avoided.

The processor hardware may be operable to generate a second guarded pointer from a first guarded pointer, the second guarded pointer identifying a subsegment within the segment identified by the first guarded pointer. To that end, the processor changes a value in the length field to decrease the number of bits in the offset subfield and to increase the number of bits in the segment subfield. The result is decreased offset range and finer segment location resolution within the original segment. However, the segment can not be enlarged by an application program.

The processor hardware may also be operable to generate a second guarded pointer from a first guarded pointer by performing an arithmetic operation on the offset. The processor hardware checks the second guarded pointer for over or underflow by detecting a change in value in the segment subfield. The hardware may also modify the permission field of a guarded pointer to generate a pointer having only more restricted access to the indicated segment. For example, a program having permission to read/write may create a pointer to the same memory segment with permission only to read.

ENTER guarded pointers may be restricted for processing by the processor hardware to only jump to the identified address within the protected segment and to execute. Such pointers allow access to code beginning at the pointer address but prevent bypass of portions of the code and prevent changing or copying of the code. Other preferred pointer types are read-only pointers, read/write pointers, execute pointers and key pointers. Key pointers may not be modified or used for data access.

In accordance with another aspect of the invention, a method is provided for global addressing across plural processor nodes. A virtual address is applied to a global translation buffer to identify a mapping of a page group to a set of nodes in a system. From the virtual address and the identified mapping, the system determines a destination node at which a page containing the virtual address resides. A message including the address, which may be in a guarded pointer, may be forwarded to the destination node, and translation of the virtual address to a physical address may be performed at that node. By translating to groups of nodes, rather than an individual node for each virtual address, the size of the global translation buffer can be substantially reduced.

Preferably, the global translation buffer identifies each page group by a group size which is logarithmically encoded. It also specifies, in each group entry, a start node and the physical range of nodes within the group. Preferably, the range is specified in plural dimensions, specifically in the X, Y and Z dimensions of an array. That range is preferably also logarithmically encoded. Finally, the translation buffer may specify the number of pages of the page group per node.

In accordance with another aspect of the invention, virtual page addresses are translated to physical page addresses at each processor node and each virtual page is subdivided into blocks. At each processor node on which data from a virtual page is stored, a block status flag is provided for each block of the virtual page. Blocks of data may be copied between nodes and, based on the block status flags, access to individual blocks on a node is restricted. The use of the blocks allows for finer granularity in data transfers. The status flags are preferably stored in a virtual to physical translation buffer. Block status flags may also be stored with the data in cache memory, and the block status flags in the translation buffer may be updated from cache memory.

The preferred states of the status flags include invalid, read only, read/write and read/write but dirty. The dirty designation is provided in order to indicate to the home node that the data has been changed since being loaded from the home node.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being place upon illustrating the principles of the invention.

DETAILED DESCRIPTION OF THE INVENTION

Guarded Pointers

Guarded pointers are provided as a solution to the problem of providing efficient protection and sharing of data. Guarded pointers encode permission and segmentation information within tagged pointer objects to implement capability requirements of the type presented in Fabry, R., "Capability-based addressing," *Communications of the ACM* 17,7 (July 1974), 403–412. A guarded pointer may be stored in a general purpose register or in memory, eliminating the need for special storage. Because memory may be accessed directly using guarded pointers, higher performance may be achieved than with traditional implementations of capabilities, as table lookups to translate capabilities to virtual addresses are not required.

Figure 1A:
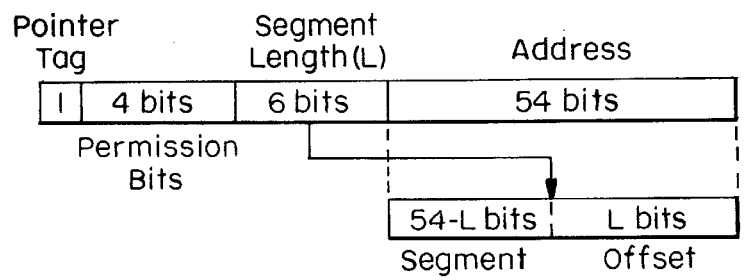
FIG. 1A illustrates the format of a guarded pointer embodying the present invention.

FIG. 1A shows the format of a guarded pointer. A single pointer bit is added to each 64-bit memory word. Fifty-four bits contain an address, while the remaining ten bits specify the set of operations that may be performed using the pointer (4 bits) and the length of the segment containing the pointer (6 bits). Segments are required to be a power of two words long, and to be aligned on their length. Thus, a guarded pointer specifies an address, the operations that can be performed using that address, and the segment containing the address. No segment or capability tables are required. Since protection information is encoded in pointers, it is possible for all processes to share the same virtual address space safely, eliminating the need to change the translation scheme on context switches and facilitating the use of virtually-addressed caches.

All memory operations in a system that use guarded pointers require that one of their operands be a guarded pointer and that the permission field of the pointer allow the operation being attempted. Users are not allowed to set the pointer bit of a word, although they may manipulate pointers with instructions that maintain the protection scheme. This prevents users from creating arbitrary pointers, while allowing address arithmetic within the segments that have been allocated to a user program. Privileged programs are allowed to set the pointer bit of a word and thus can create arbitrary pointers.

Memory systems that use guarded pointers provide a single virtual address space shared by all processes. Each guarded pointer identifies a segment of this address space that may be any power of two bytes in length, and must be aligned on its size. These restrictions allow six bits of segment length information and 54 bits of virtual address to completely specify a segment. The length field of a guarded pointer encodes the base-two logarithm of the segment length. This allows segments ranging in length from a single byte up to the entire $2^{54}$ byte address space in power of two increments. As shown in FIG. 1 the length field also divides the address into segment identifier and offset fields. A four-bit permission field completes the capability by identifying the set of operations permitted on the segment.

Figure 1B:
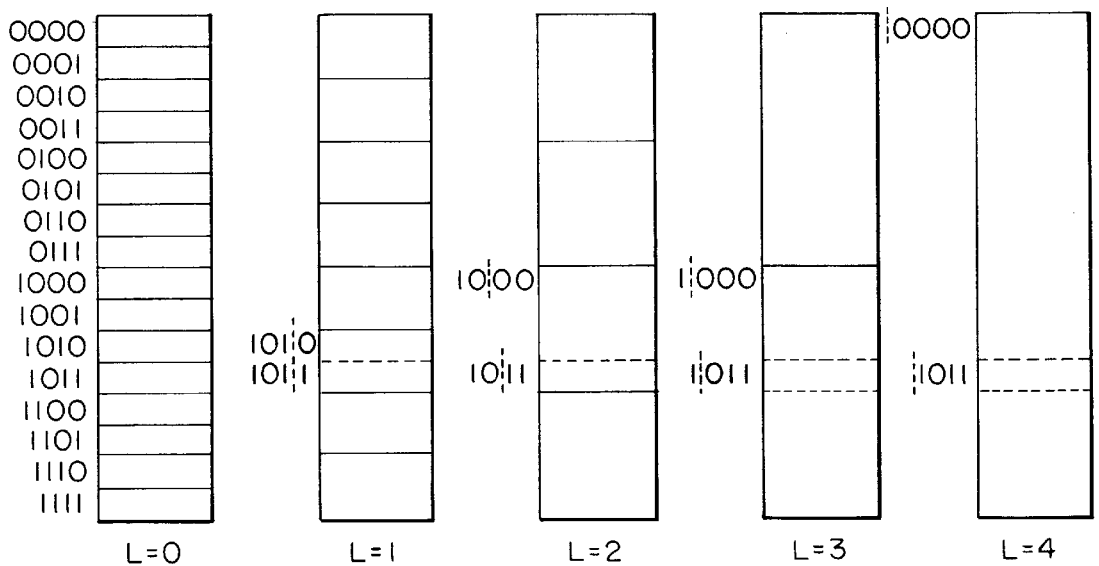
FIG. 1B illustrates a simple application of a guarded pointer having only a four bit address field.

FIG. 1B presents a simple illustration of the segment length and address fields of the guarded pointer assuming an address field of only 4 bits and a length field of 3 bits. With the length L equal to zero, each segment is of length $2^0=1$ word in length. As illustrated by the vertical broken line, the segment length L positions the division between offset and segment to the far right of the address, so there would be no offset. Each segment base address would also be the address of the addressed word. With L equal one, each segment is of $2^1=2$ words long. The broken line indicates a one bit offset. Where the full address is 1011, the base address 1010 of the segment is defined by setting the offset to zero.

Similarly, with increasing values of L the number of words in the segment defined by the guarded pointer increases exponentially, and the base address for the segment is defined by setting all offset bits to zero.

It can be seen from FIG. 1B that two pointers having a common address 1011 may indicate that the address is within a segment ranging in length from one byte to 16 bytes. Since the base address is determined by setting the offset to zero, segments must be a power of two words long and must be aligned on their length. As discussed below, the segment definition is important to define the segment of addresses within which a particular program may operate by modifying a given pointer. Generally, permission is granted to modify addresses only within a segment.

The permission field of a pointer indicates how a process may access the data within the segment. Pointer permissions may specify data access, code access, protected entry points, and protected identifiers (keys). The permissions granted are with respect to use of the pointers. All pointers may themselves be stored in memory and loaded from memory. It is use of the pointers to access data at the indicated addresses which is restricted. The following is a representative set of permissions:

A Read Only pointer may be used to load data and the pointer may be altered within segment bounds. Store and jump operations using the pointer are not permitted.

A Read/Write pointer may be used by load and store operations, but not jump operations. It may be altered within its segment bounds.

Execute pointers may be used by jump and load operations and may be modified within segment bounds. Thus, holding an execute pointer to a code segment enables a program to jump to any location within the segment and to read the segment. Execute pointers may be either execute-user or execute-privileged, which encodes the supervisor mode bit explicitly within the instruction pointer. Privileged instructions, such as SETPTR, may only be executed with an execute-privileged instruction pointer.

Enter pointers may be used only by jump operations. They cannot be used for loads and cannot be modified in any way. Thus, holding an enter pointer enables a program to enter a code segment at a single location. Jumping to an enter pointer converts it to an execute pointer which is then loaded into the instruction pointer. There are two types of enter pointers: enter-user and enter-privileged, which are converted to the corresponding type of execute pointer by a jump.

A Key pointer may not be modified or referenced in any way. It may be used as an unforgeable, unalterable identifier.

Physical: The pointer references data in physical memory on the local node. This bypasses the virtual memory system ignoring the LTLB on cache misses. If the address exceeds the size of local physical memory, the top bits are ignored.

Since the set of pointer states does not require all of the possible four bit values, architects may implement pointer types to support particular features of their architecture, such as the following pointer types, which are implemented on the M-Machine.

Execute Physical: Data may be read or executed as code, but not written. On cache misses, the TLB is not accessed. The thread is in privileged mode.

Enter Message: Code at this address may be executed in a message handler. A send operation faults if the designated IP is not in this state.

Configuration Space: Indicates that the address refers to an internal register in the processor.

Errval: The pointer has been generated by a deferred exception. Any attempt to use an Errval pointer as an operand will cause an exception.

As noted, each pointer contains a six bit segment length field that holds the log base 2 of the size of the segment in which the address resides. Thus, segments may be of any power of 2 size between 1 and $2^{54}$ bytes. This encoding allows the base address and the extent of a pointer's segment to be determined without accessing any additional information. User-level instructions that manipulate pointers (LEA, LOAD, STORE) have the lower and upper bounds of their segment checked automatically to ensure that the operation does not access memory outside of the allowed segment.

This segmentation and access control system provides flexibility to the user, while still permitting strictly enforced security. Segments can be overlapped and shared as long as each segment is aligned to an address that is a multiple of its size. Since all of the necessary segmentation information is contained within each pointer, a separate table of segment descriptors is unnecessary. More importantly, instructions need not access such a table to check segmentation restrictions on memory accesses. Also, access to system functions and other routines can be given to non-trusted programs, as the enter-privileged and enter-user permission states ensure that a user may only execute code starting at the specified entry point. A MEMBAR (memory barrier) instruction is used to block further instructions from executing until all outstanding memory references have completed.

Pointer Operations

Guarded pointers may be implemented by adding a few pointer manipulation instructions to the architecture of a conventional machine and adding checking hardware to verify that each instruction operates only on legal pointer types and that address calculations remain within pointer bounds.

Figure 2A:
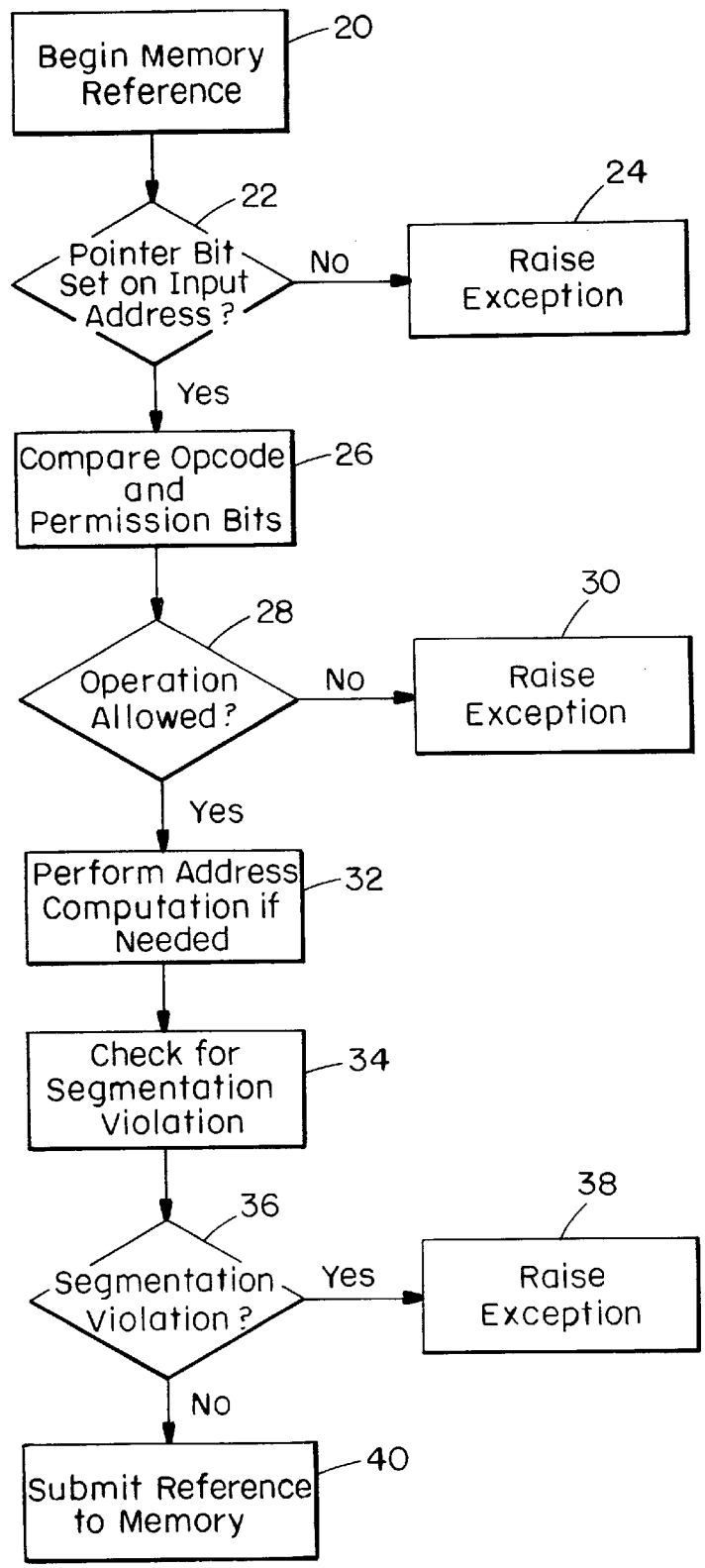
FIG. 2A is a flow chart of a memory request in a system that includes guarded pointers.

FIG. 2A shows a flow chart of the steps involved in performing a memory reference beginning at 20 in a system that incorporates Guarded Pointers. First, the pointer bit of the operand containing the address being referenced is checked at 22 to determine if the address operand is a guarded pointer. If the pointer bit is not set, an exception occurs at 24. Second, the permission field of the pointer is checked at 26 and 28 to verify that it allows the operation being attempted, and an exception raised at 30 if it does not. If the operation involves address computation, an integer offset is then added to the address field of the pointer at 32. Segmentation violation is checked at 34 and 36. An exception 38 is raised if the result of this add overflows or underflows into the fixed segment portion of the address, which would create a pointer outside the original segment. If all of these checks pass, the operation is submitted to the memory system at 40 to be resolved.

Load/Store: Every load or store operation requires a guarded pointer of an appropriate type as its address argument. Protection violations are detected by checking the permission field of the pointer. If the address is modified by an indexed or displacement addressing mode, bounds violations are checked by examining the length field as described below. The protection provided by guarded pointers does not slow load or store operations. All checks are made before the operation is issued without reference to any permission tables. Once these initial checks are performed, the access is guaranteed not to cause a protection violation, although events in the memory system, such as TLB misses, may still occur.

Pointer Arithmetic: An LEA (load effective address) instruction may be used to calculate new pointers from existing pointers. This instruction adds an integer offset to a data (read or read/write) or execute pointer to produce a new pointer. An exception is raised if the new pointer would lie outside the segment defined by the original pointer. For efficiency, a LEAB operation, which adds an offset to the base of the segment contained in a pointer may be implemented, as well. If a guarded pointer is used as an input to a non-pointer operation, the pointer bit of the guarded pointer is cleared, which converts the pointer into an integer with the same bit fields as the original pointer.

Figure 2B:
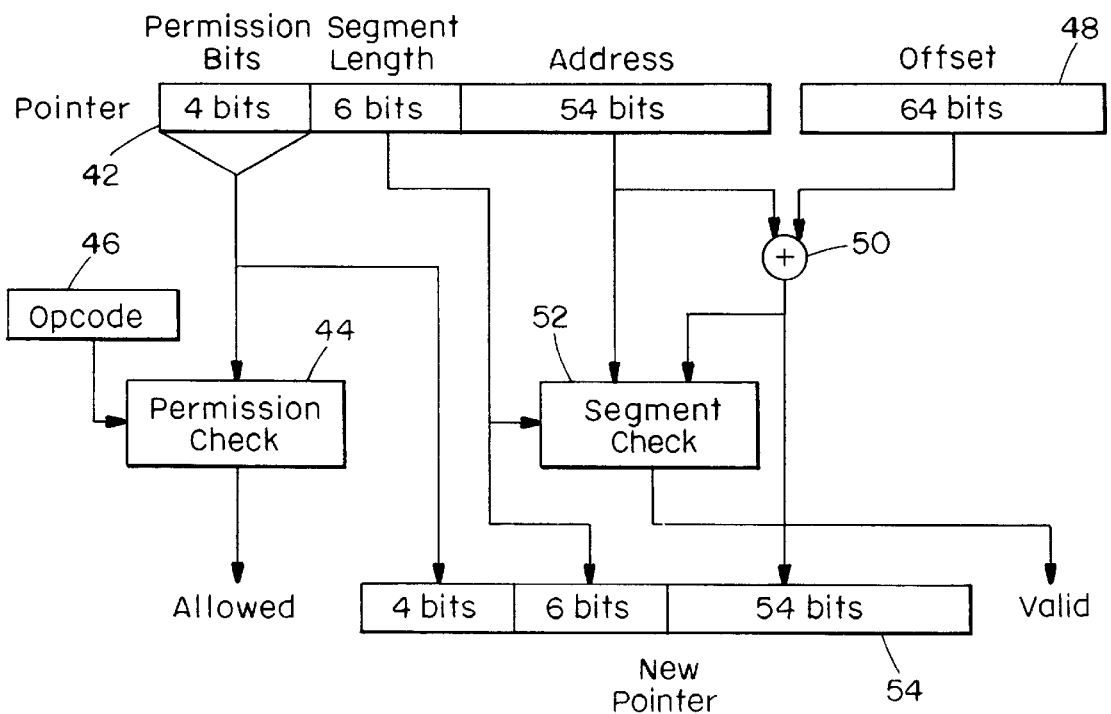
FIG. 2B illustrates the hardware utilized in an LEA operation in which an offset is added to an existing pointer.

FIG. 2B details the protection check hardware used on a pointer calculation. The permission field of the pointer 42 is checked at 44 against the opcode 46 to verify that the requested operation using the pointer is permissible. In that respect, the permission check hardware need only decode the opcode to identify permission bits which are appropriate for that opcode and compare those bits to the permission bits of the pointer 42 in combinational logic. An integer offset 48 may be added to the address field of the pointer at 50 to generate the new pointer 54. An exception is raised if the result of this add over or underflows into the fixed segment portion of the address, which would create a pointer outside the original segment. This may be detected in the segment check 52 by comparing the fixed portion of the address before the add to the same field of the resulting pointer.

Figure 3:
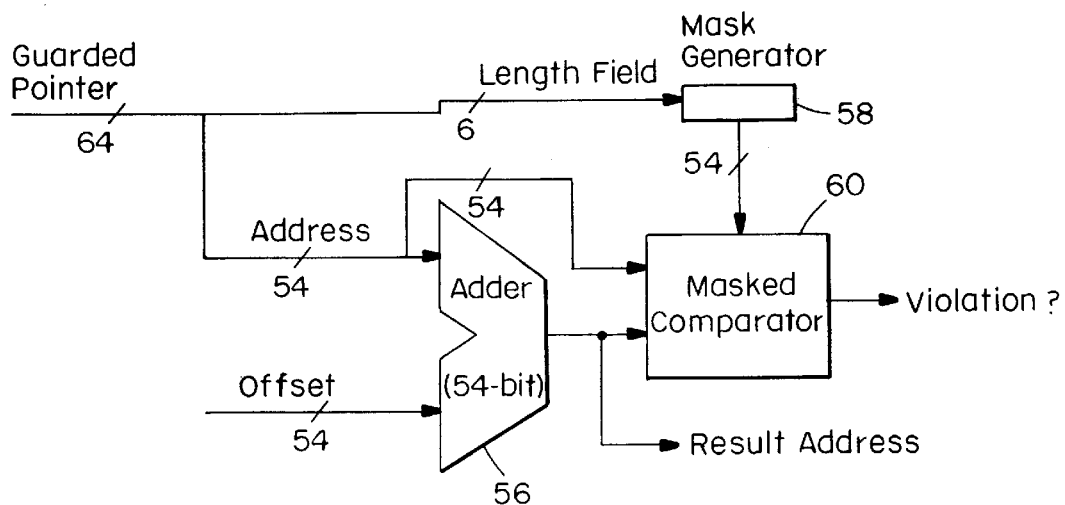
FIG. 3 illustrates the adder and segment check of FIG. 2B.
Figure 4:
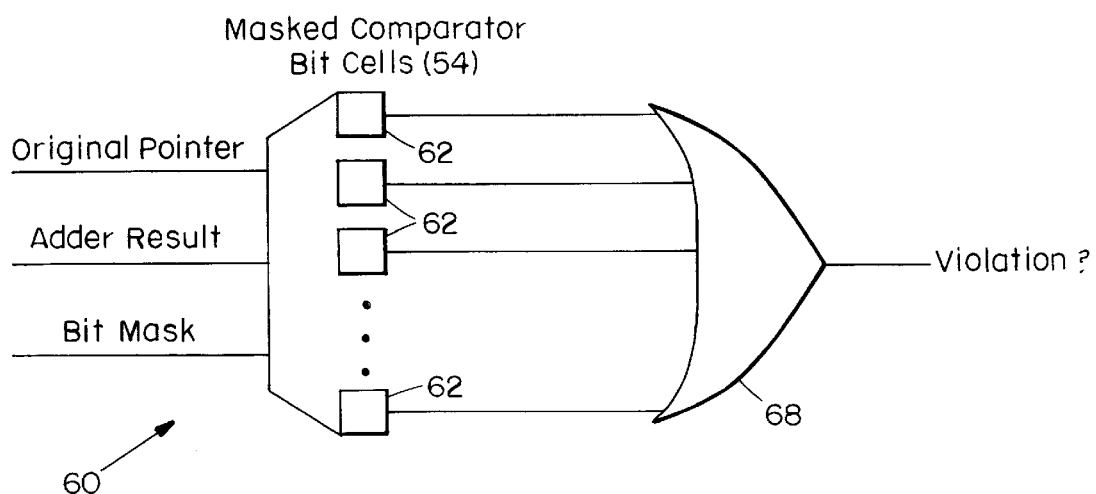
FIG. 4 illustrates the masked comparator of FIG. 3.
Figure 5:
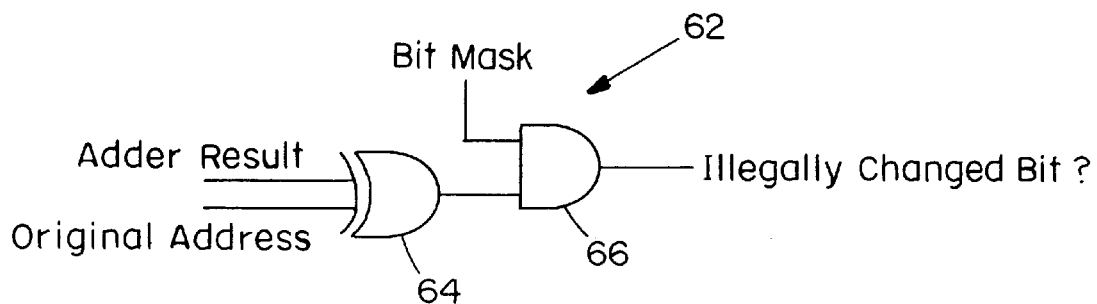
FIG. 5 illustrates a masked comparator bit cell in FIG. 4.

FIGS. 3, 4 and 5 show in greater detail the hardware of FIG. 2B used in performing an address calculation on a guarded pointer. The 54-bit address field of the pointer is added in adder 56 to a 54-bit offset to get the result address. The 6-bit length field of the pointer is fed to a mask generator 58, which generates a 54-bit output applied as a mask to masked comparator 60. Each bit in this output is set to one if the corresponding bit in the address represents a bit in the segment identifier and to zero if the bit represents a bit in the offset portion of the address. Bits in the offset portion of the address are allowed to change during address calculation, while bits in the segment identifier are not.

FIG. 4 illustrates the masked comparator 60. Each bit of the original address, the corresponding bit of the result address, and the corresponding bit of the mask are fed into a comparator cell 62, as shown in FIG. 5. The output of XOR gate 64 is one if the bit from the original address and the bit from the result address differ. This output is then ANDed at 66 with the bit from the bit mask, which is one if the bit being examined is part of the segment portion of the address, and therefore not allowed to change. The outputs of all the comparator cells are ORed together at 68 to determine if any of the segment bits changed during the addition of the offset, which indicates that a segmentation violation has occurred.

Guarded pointers expose to the compiler address calculations that are performed implicitly by hardware in conventional implementations of segmentation or capabilities. With the conventional approach, the segmentation hardware performs many redundant adds to relocate a series of related addresses. Consider, for example, the following loop:

$$for(I=0;i<N;i++)\ s=s+a[i];$$

In a conventional system, each reference to array a would require the segmentation hardware to automatically add the segment offset for each a[i] to the segment base. With guarded pointers, the add can be performed once in software, and then the resulting pointer can be incrementally stepped through the array, avoiding the additional level of indirection.

Languages that permit arbitrary pointer arithmetic or type casts between pointers and integers, such as C, are handled by defining code sequences to convert between pointer and integer types. The pointer-to-integer cast operation takes a guarded pointer as its input and returns an integer containing the offset field of the guarded pointer. This can be performed by subtracting the segment base, determined using the LEAB instruction, from the pointer:

LEAB Ptr, 0, Base SUB Ptr, Base, Int

The integer-to-pointer case operation uses the LEAB instruction to take an integer and create a pointer into the data segment of the process with the integer as its offset, as long as the integer fits into the offset field of the data segment. Note that neither of these case operations requires any privileged operations, which allows them to be inlined into user code and exposed to the compiler for optimization.

Pointer Creation: A process executing in privileged mode, with an execute-privileged IP, has the ability to create arbitrary pointers and hence access the entire address space. Privileged mode is entered by jumping to an enter-privileged pointer. It is exited by jumping to a user pointer (enter or execute). While in privilege mode, a process may execute a SETPTR instruction to convert an integer into a pointer by setting the guarded pointer bit. Thus, a privileged process may amplify pointer permissions and increase segment lengths while a user process can only restrict access. No other operations need be privileged, as guarded pointers can be used to control access to protected objects such as system tables and I/O devices.

Restricting Access: A process may create pointers with restricted permissions from those pointers that it holds. This allows a process to share part of its address space with another process or to grant another process read-only access to a segment to which it holds read/write permission.

A RESTRICT instruction takes a pointer, P, and an integer permission type, T, and creates a new pointer by substituting T for the protection field of P. The substitution is performed only if T represents a strict subset of the permissions of P so that the new pointer has only a more restricted access. For example, a read pointer may be created from a read/write pointer, but not vice versa. Otherwise, an exception is raised.

Similarly the SUBSEG instruction takes an integer length, L, and a pointer, P, and substitutes L into P if L is less than the original length field of P, so that the created segment is a subset of the original. Changing to a lesser length decreases the length of the offset subfield for decreased offset range and increases the length of the segment field for finer segment location resolution.

The RESTRICT and SUBSEG instructions allow a user process to control access to its memory space efficiently, without system software interaction. The RESTRICT and SUBSEG instructions are not completely necessary, as they can be emulated by providing user processes with enter-privileged pointers to routines that use the SETPTR instruction to create new pointers that have restricted access rights or segment boundaries. The M-Machine, which will be described in the next section, takes this approach.

Pointer Identification: The ISPOINTER instruction is provided to determine whether a given word is a guarded pointer. This instruction checks the pointer bit and returns its state as an integer. Quick pointer determination is useful for programming systems that provide automatic storage reclamation, such as LISP, which need to find pointers in order to garbage collect physical space (Moon, D. A. Symbolics Architecture, IEEE Computer (1987), 43–52).

Protected Subsystems

Figure 6:
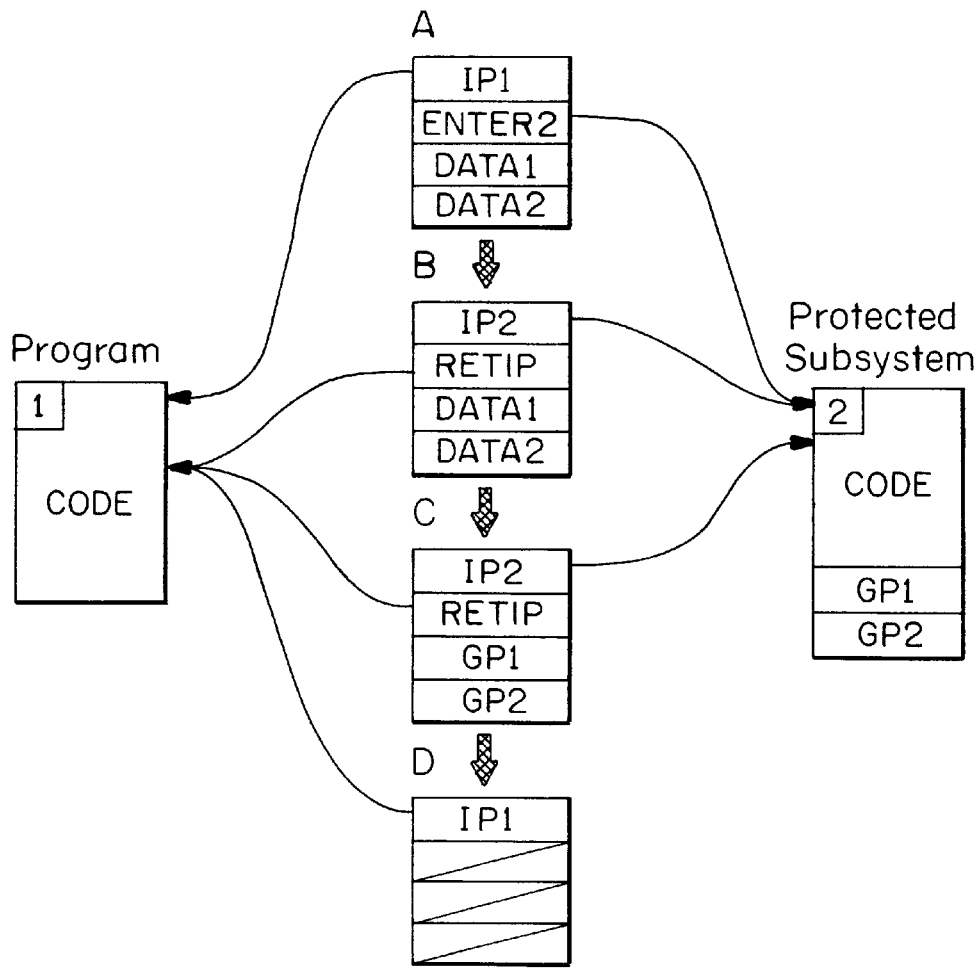
FIG. 6 illustrates register states when a program enters a protected subsystem by jumping to an enter pointer.

ENTER pointers facilitate the implementation of protected subsystems without kernel intervention. A protected subsystem can be entered only at specific places and may execute in a different protection domain than its caller. Entry into a protected subsystem, such as a file system manager, is illustrated in FIG. 6. A program enters a protected subsystem by jumping to an enter pointer. After entry the subsystem code loads pointers to its data structures from the code segment. A represents the register state of the machine before the protected subsystem call, B the register state just after the call, C the register state during the execution of the protected subsystem, and D the register state immediately after the return to the caller.

Before the call, the calling program (segment 1) holds an enter pointer to the subsystem's code segment (segment 2) which contains the subsystem code as well as pointers to the subsystem's data segments, such as the file system tables. To enter the subsystem, the caller jumps to ENTER2, causing the hardware to transfer control to the entry point and convert the enter pointer to the execute pointer IP2 in register state B. The return instruction pointer (RETIP) is passed as an argument to the subsystem. The subsystem then uses the execute pointer to load GP1 and GP2, the pointers to its data structures (state C). The subsystem returns to the calling program by overwriting any registers containing private pointers and jumping to RETIP (state D).

Figure 7:
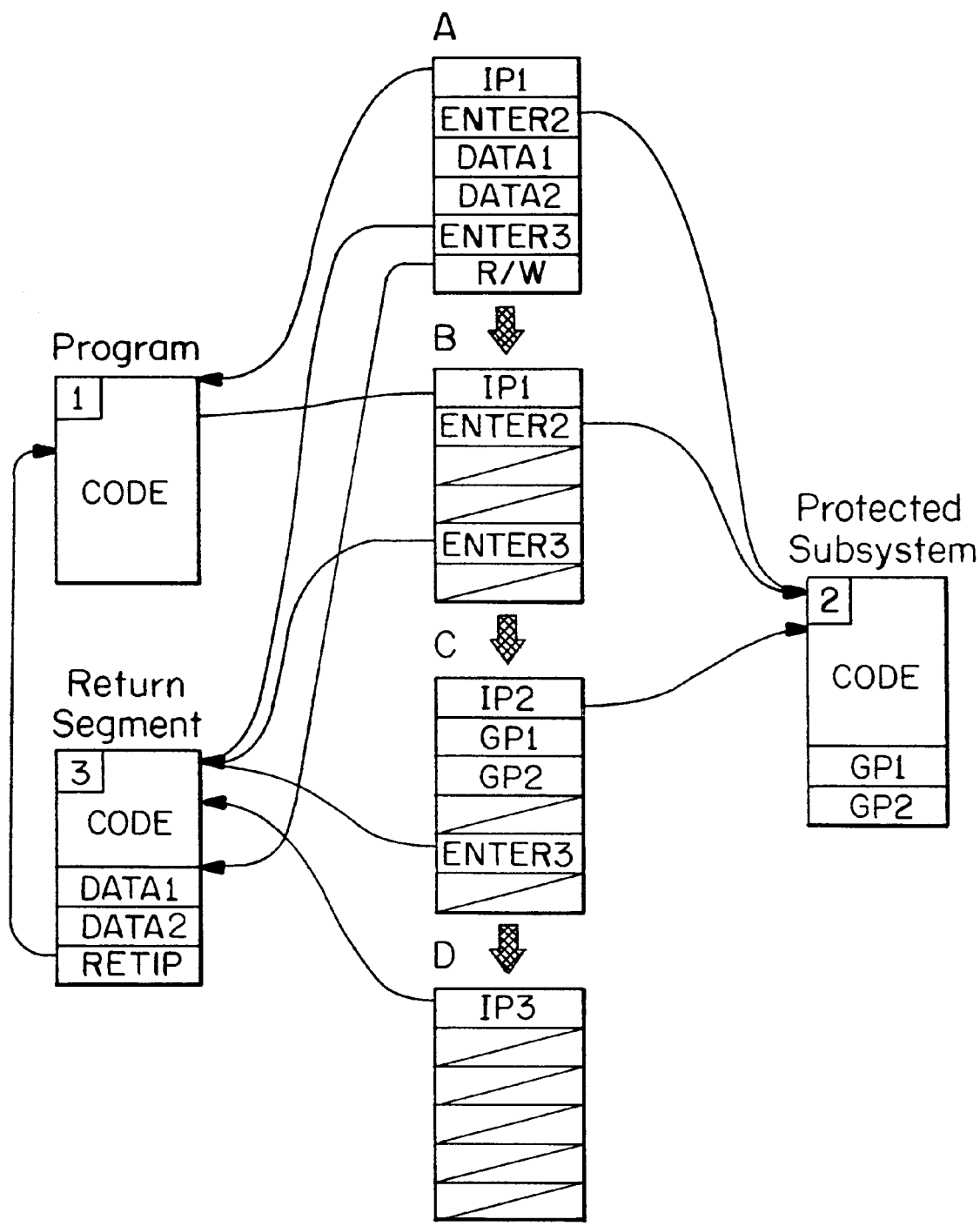
FIG. 7 illustrates register states when two way protection is provided by creating a return segment.

The sequence described above provides one-way protection, protecting the subsystem's data structures from the caller. To provide two-way protection, the caller (segment 1) encapsulates its protection domain in a return segment (segment 3) as shown in FIG. 7. Before the call (state A), the caller holds both enter and read/write pointers to a return segment. The caller writes all the live pointers in its registers into the return segment to protect them from the subsystem (segment 2). It then overwrites all of the pointers in its register file except the enter pointer to the return segment (ENTER3), the subsystem enter pointer (ENTER2), and any arguments for the call (state B). The subsystem call then proceeds as described above. After entry, the subsystem holds only an enter pointer to the return segment and thus cannot directly access any of the data segments in the caller's protection domain (state C). The subsystem returns by jumping to the return segment (state D), which reloads the caller's saved pointers and returns to the calling program.

ENTER pointers allow efficient realization of protected system services and modular user programs that enforce access methods to data structures. Modules of an operating system, e.g., the file-system, can be implemented as unprivileged protected subsystems that contain pointers to appropriate data structures. Since these data structures cannot be accessed from outside the protected subsystem, the file-system's data structures are protected from unauthorized use. Even an I/O driver can be implemented as an unprivileged protected subsystem by protecting access to the read/write pointer of a memory-mapped I/O device. With protected entry to user-level subsystems, very few services actually need to be privileged.

Implementation Costs

Hardware: Guarded pointers have two hardware costs: an increase in the amount of memory required by a system and the hardware required to perform permission checking. To prevent unauthorized creation or alteration of a guarded pointer, a single tag bit is required on all memory words, which results in a 1.5% increase in the amount of memory required by the system.

The hardware required to perform permission checking on memory access, and segment bounds checking on pointer manipulation, is minimal. One decoder for the permission field of the pointer, one decoder for the opcode of the instruction being executed, and a small amount of random logic are required to determine if the operation is allowed. The pointer bit of an operand can be checked at the same time, to determine if it is a legal pointer. To check for segment bounds violations when altering a pointer, a masked comparator is needed. It compares the address before and after alteration and signals a fault if any of the segment bits of the address field change.

Memory systems based on guarded pointers do not require any segmentation tables or protection lookaside buffers in hardware, nor is it necessary to annotate cached virtual-physical translations with a process or address space identifier. As with other single address space systems, the cache may be virtually addressed, requiring translation only on cache misses.

Address Space: Since 6 to 10 bits are required to encode the permission and segment length field of a guarded pointer, the virtual address space is reduced. On a 64-bit machine, a guarded pointer virtual address is 54 bits, which provides 16 petabytes of virtual address space, enough for the immediate future. Several current processors support 64-bit addresses, but only translate some of the bits in each address. For example, the DEC Alpha 21064 only translates 43 bits of each 64-bit address (Digital Equipment Corporation, *Alpha Architecture Handbook*. Maynard, Mass., 1992).

There is an opportunity cost associated with reducing the virtual address space, however. Some system designers take advantage of large virtual address spaces to provide a level of security through sparse placement of objects. For example, the Amoeba distributed operating system (Mullender, S. J., Van Rossum, G., Tanenbaum, A. S., Van Renesse, R. and Van Staveren, H., "Amoeba: A distributed operating system for the 1990s" *IEEE Computer* 23 (May 1990), 44–53) protects objects using a software capability scheme. These capabilities are kept secret by embedding them in a huge virtual address space. This becomes less attractive if the virtual address space is 1000 times smaller. Of course, this particular use of a sparse virtual address space can be replaced by the capability mechanism provided by guarded pointers.

Virtual address space fragmentation is another potential problem with guarded pointers, as segments must be powers of two words in length and aligned. Internal fragmentation may result when the space needed by an object must be rounded up to the next power of two words. However, this does not result in much wasted physical memory, since physical space is allocate on a page-by-page basis, independent of segmentation. External fragmentation of the virtual address space may occur when recycled segments cannot be coalesced into contiguous sections of usable sizes. A buddy memory allocation scheme, which combines adjacent free segments into larger segments, can be used to reduce this fragmentation problem.

Software Implementations

While guarded pointers enable efficient implementation of many desirable operating system features, some shortcomings inherent in single-address-space and capability-based architectures can be addressed by the software system designer using guarded pointers.

The efficiency of guarded pointers is largely due to eliminating indirection through protected segment tables. With guarded pointers there is no need to store these tables or to access them on each memory reference. Without protected indirection, modifying a capability requires scanning the entire virtual address space to update all copies of the capability. This is needed, for example, when relocating a segment or revoking access rights to a segment. In some cases this expensive operation can be avoided by exploiting the paging translation, user-level indirection or protected subsystems.

All guarded pointers to a segment can be simultaneously invalidated by unmapping the segment's address space in the page table. All subsequent accesses using pointers to this segment will raise exceptions. This directly revokes all capabilities to a segment. Segments can be relocated by updating the pointer causing the exception on each reference to the relocated segment. One limitation of this approach is that it operates on a page granularity while segments may be any size, down to a single byte in length. Thus relocating or revoking access to a segment may affect the performance of references to several unrelated bystander segments.

Indirection can be performed explicitly in software where it is required. If a segment's location is unknown or is expected to move frequently, a program can make all segment references to offsets from a single segment base pointer. Only this single pointer needs to be updated when the segment is moved. With explicit indirection, overhead is incurred only when indirection is needed, and then it is exposed to the compiler for optimization. Since no hardware prevents user code from copying the segment base pointer, relocation or revocation through explicit indirection requires adherence to software conventions.

It is impossible in any capability-based system to directly revoke a single process' rights to access a segment without potentially affecting other processes. Since possession of a capability confers access rights, the only way to remove access rights from a single process is to remove all capabilities containing those access rights from the memory addressable by the process. This can be accomplished by sweeping the memory that the process can address, and overwriting the correct capabilities, so long as none of the memory containing those capabilities is shared. If the pointers that need to be overwritten are contained within a shared segment, all processes which rely on the pointer will lose access privileges. This is due to the lack of a protected table that stores permission information on a per-process basis.

Protected indirection can be implemented by requiring that all accesses to an object be made through a protected subsystem. In addition to restricting the access methods for the object, the subsystem can relocate the object at will and can implement arbitrary protection mechanisms. For example, the subsystem could implement a per-process access control list. Revoking a single process' access rights can be performed by updating the access control list. Accessing an object through a protected subsystem is advisable if the object must be relocated or have its access rights changed frequently and if the object is referenced infrequently or only via the subsystem access methods.

Without indirection, address space is allocated "for all time," requiring the system software to periodically garbage collect the virtual address space, so that addresses no longer in service can be reused. This is simplified with guarded pointers, as pointers are self identifying via the tag bit. Thus, the live segments can be found by recursively scanning the reachable segments from all live processes and persistent objects.

The M-Machine

The M-Machine memory system provides an example of how guarded pointers may be used. The M-Machine is a multicomputer with a 3-dimensional mesh interconnect and multithreaded processing nodes (Dally, W. J., Keckler, S. W., Carter, N., Chang, A., Fillo, M., and Lee, W. S. "M-Machine architecture v1.0," Concurrent VLSI Architecture Memo 58, Massachusetts Institute of Technology, Artificial Intelligence Laboratory, January 1994 and Keckler, S. W., and Dally, W. J., "Processor coupling: Integrating compile time and runtime scheduling for parallelism", *Proceedings of the 19th International Symposium on Computer Architecture* (Queensland, Australia, May 1992), ACM, pp 202–213, and U.S. application Ser. No. 08/062,388). One of the major research goals of the M-Machine is to explore the best use of the increasing number of transistors that can be placed on a single chip.

Figure 8:
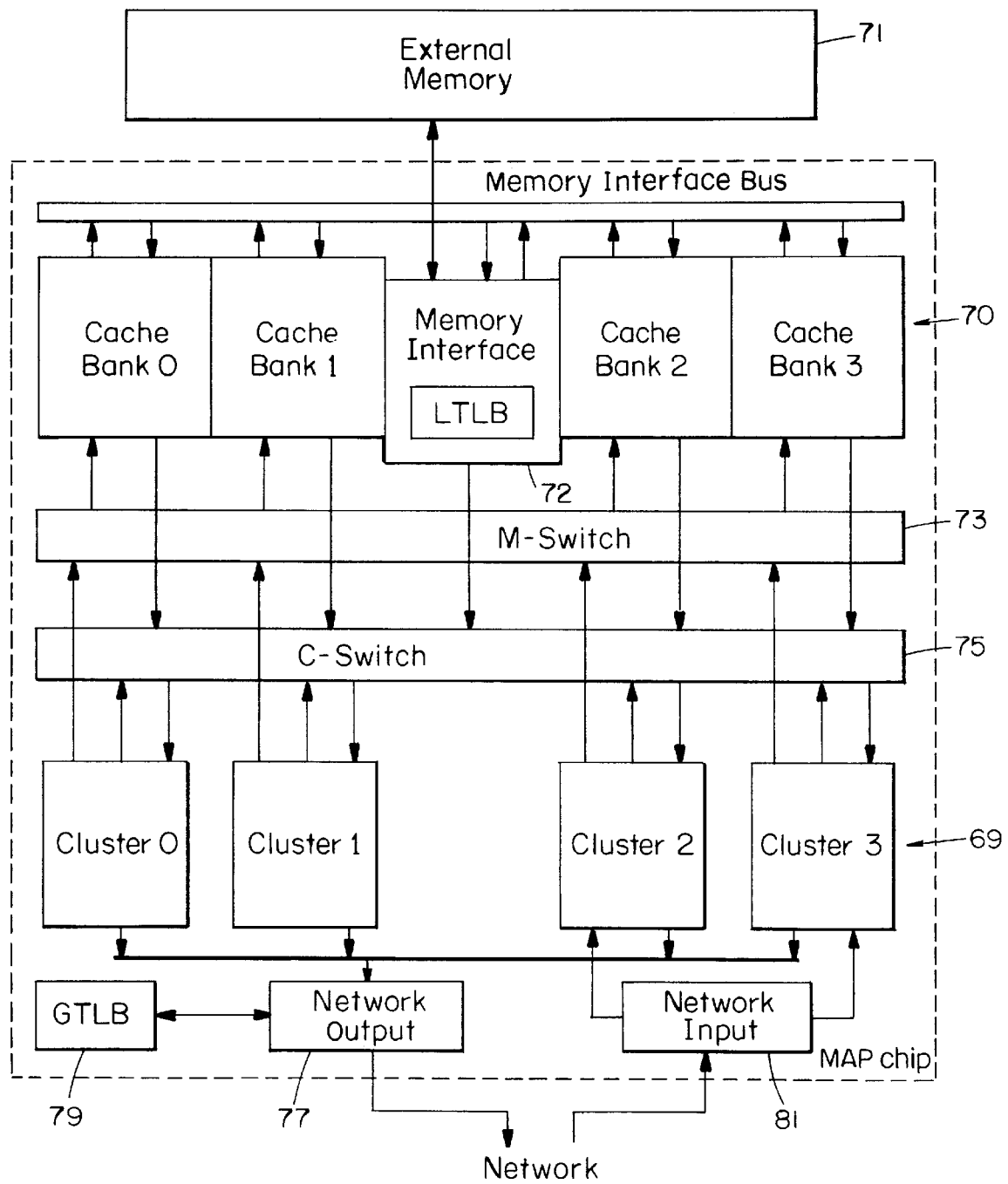
FIG. 8 is a block diagram of a processor chip used in an M-Machine embodying the present invention.

The processing nodes of the M-Machine (known as multi-alu processors, or MAPs) operate on 64-bit integer and floating-point data types and use 64-bit guarded pointers (plus a tag bit) to access a 54-bit, byte-addressable, global address space, which is shared by all processes and nodes of the machine. FIG. 8 shows a block diagram of a MAP chip. Each MAP chip contains twelve execution units: four integer units, four floating-point, and four memory units. These execution units are grouped into four clusters 69, each containing one execution unit of each type.

To increase the utilization of these hardware resources when executing programs that have insufficient instruction-level parallelism, the M-Machine implements multithreading. Four user threads share the processing resources of each cluster, for a total of sixteen user threads in execution at any time. Each cycle, the hardware on each cluster examines the threads in execution on it and selects one thread to execute on the hardware resources. The three execution units in a cluster are allocated and statically scheduled as a long instruction word processor.

Each M-Machine node contains an on-chip 4-bank cache 70 and 1MWord (8MBytes) of off-chip memory 71. The cache is virtually addressed, and addresses are interleaved across the banks. This allows the memory system to accept up to four memory requests during each cycle, matching the peak rate at which the processor clusters can generate requests. Requests that miss in the cache arbitrate for the external memory interface 72, which can only handle one request at a time. The interface 72 also holds the LTLB. Request to memory are made by cluster 69 through an M-switch 73, and responses are passed back through a C-switch 75. Transfers between clusters are also made through the C-switch.

Messages are routed through the network by an output interface 77 using the GTLB 79. Incoming messages are queued in an input interface 81.

The M-Machine presents two challenges to a protection system. The first is cycle-by-cycle interleaving of instructions and memory references from different protection domains, while still allowing efficient sharing among them. Because guarded pointers provide memory protection without requiring each thread to have its own virtual to physical translations, memory references from different threads may be in flight simultaneously without comprising security. This enables zero cost context switching as no work must be performed to switch between protection domains.

The other challenge for both the protection and translation systems is the interleaved cache of the M-Machine, which may service up to four references simultaneously. The single address space implemented with guarded pointers allows the cache to be virtually addressed and tagged so that translations need only to be performed on cache misses. In addition, encoding all protection information in a guarded pointer eliminates any need for table lookup prior or during cache access. These two features eliminate the need to replicate or quad-port the TLB or other protection tables.

Guarded Pointer Conclusions

We have introduced guarded pointers as a hardware mechanism to implement capability-based protection and allow fast multithreading among threads from different protection domains, including concurrent execution of user programs and the operating system. We have described the M-Machine as an example of an architecture which implements guarded pointers.

A guarded pointer is an unforgeable handle to a segment of memory. Each pointer is comprised of segment permission, length, base, and offset fields. The advent of 64-bit machines allows this information to be encoded directly in a single word, without unduly limiting the memory address space. An additional tag bit is provided to prevent a user from illicitly creating a guarded pointer. Guarded pointers are an efficient implementation of capabilities without capability tables and mandatory indirection on memory access.

Guarded pointers can be used to implement a variety of software systems. Threads in different protection domains can share data merely by owning copies of a pointer into that segment. A thread can grant another thread access to private data by passing a guarded pointer to it. Protected entry points and cross-domain calls can be efficiently implemented using an entry type guarded pointer.

The costs of implementing guarded pointers are minimal. An additional tag bit is required to identify pointers, and the virtual address space is reduced by the number of bits required to encode segment permissions and lengths. In a 64 bit machine, 54 virtual address bits are left, which is ample space for the foreseeable future. A small amount of hardware is also required to perform permission checking on memory operations.

Like all single global virtual address space systems, guarded pointers permit processes from different protection domains to share the cache and paging systems without comprising security. Also like these systems, guarded pointers eliminate multiple translations and permit processes to access an interleaved virtual cache without requiring multiple TLBs. Guarded pointers do share some of the deficiencies of single address space memory systems (garbage collecting virtual address space), and capability systems (relocating and revoking access to segments).

By encoding a segment descriptor in the pointer itself and checking access permissions in the execution unit, guarded pointers obviate the need to check protection data in the cache bank. This permits in-cache sharing, which is not possible with methods that append the PID to the cache tag, without the expense of providing protection tables in hardware.

Consequently, guarded pointers concentrate process state in general purpose registers instead of auxiliary or special memory. Threads become more agile as less processor resident state is needed. This will enable better resource utilization in parallel systems as threads may begin execution, migrate and communicate with other threads with lower latency.

Block Status Bits

The addition of block status bits to a memory system allows relocation of data objects that are smaller than individual pages, without requiring a lookup table entry for each object. Each page of memory (4 KB) is divided into 64-byte (8 word) blocks. Two block status bits are assigned to each of the 64 blocks in a page. The status bits are used to encode the following states:

INVALID: Any attempt to reference the block raises an exception.

READ ONLY: The block may be read, but an exception occurs if a write is attempted.

READ/WRITE: Reads and writes to the block are permitted.

DIRTY: Reads and writes to the block are permitted. The line has been written at least once since the page table entry was created.

One method in which block status bits may be used to control the relocation of data is to assign each block in the memory a home node, which is responsible for managing the relocation of the blocks assigned to it. A mechanism such as the GTLB may be used to provide fast location of the home node of a block, but this is not necessary.

The home node maintains a software record of which other nodes have copies of a block, and the status of those copies. Only one node is allowed to have a copy of a block that is in the read-write state, but many nodes may have read-only copies of a block if no node has a read-write copy. This prevents different nodes from having different versions of the data in a block.

When a node requests a read-only copy of a block, the home node examines its records of which nodes have copies of the block. If no node has a read-write copy of the block, the home node issues a read-only copy of the block to the requesting node, and adds the requesting node to the list of nodes that have a copy of the block. If another node has a read-write copy of the block, the home node sends an invalidate message to the node, telling it to give up its copy of the block, and to inform the home node of the new contents of the block if the block has changed. When the home node receives notification that the read-write copy of the block has been invalidated, it issues the read-only copy of the block to the requesting node and records that the requesting node has a copy of the block.

Requests for read-write copies of a block are handled in the same manner, except that any node that has a copy of the block must invalidate its copy before the read-write copy can be given out, to prevent data inconsistency problems.

When a node receives a message telling it to invalidate its copy of a block, it examines the block status bits of that block. If the block is in a read-only or read-write state, then the node has not changed the contents of the block, and the block can be discarded and the home node informed that this has been done. If the block is in the dirty state, then its contents have been changed since the node received its copy of the block, and the node must send the changed copy of the block back to the home node before its discards the block.

When a data word is accessed in the memory, the block status bits corresponding to that word are retrieved as well as the word being accessed. The block status bits are compared to the operation being attempted; and an exception is raised if any operation is attempted on a word whose block status bits are in the invalid state, or if an operation that modifies memory is attempted on a word whose block status bits are in the read-only state. If an operation is not allowed, the operation is cancelled before it modifies the state of the memory. If the operation modifies the location being referenced, the block status bits corresponding to that location are set to "dirty" if the operation is allowed. This allows the hardware to quickly determine if a block has been modified, as any modifications to a block will cause its status bits to enter the dirty state.

The block status bits for each mapped page on a node are contained in the local page table of that node. When the translation for a page is brought into the local translation lookaside buffer (LTLB), the status bits for the blocks contained in that page are copied into the LTLB as well. When a block of data is brought into the cache from the main memory, the block status bits for that block are examined in the LTLB. The cache status of the block is set to read-only if the block status in the LTLB entry is read-only. If the LTLB block status is read/write or dirty, then the cache status is set to read/write. Attempts to bring a block in the invalid state into the cache causes an exception. The dirty bit of a block's status in the cache is always set to zero when the block is brought into the cache to reflect the fact that the block has not been modified since it was brought into the cache. This does not change the status of the block in the LTLB. When a block is evicted from the cache, its dirty bit is examined, and the status of the block in the LTLB changed to dirty if the cache dirty bit is set to one. When an LTLB entry is evicted, its block status bits are simply copied out to the local page table, as the LTLB entry contains the most recent copy of the status bits.

Figure 9:
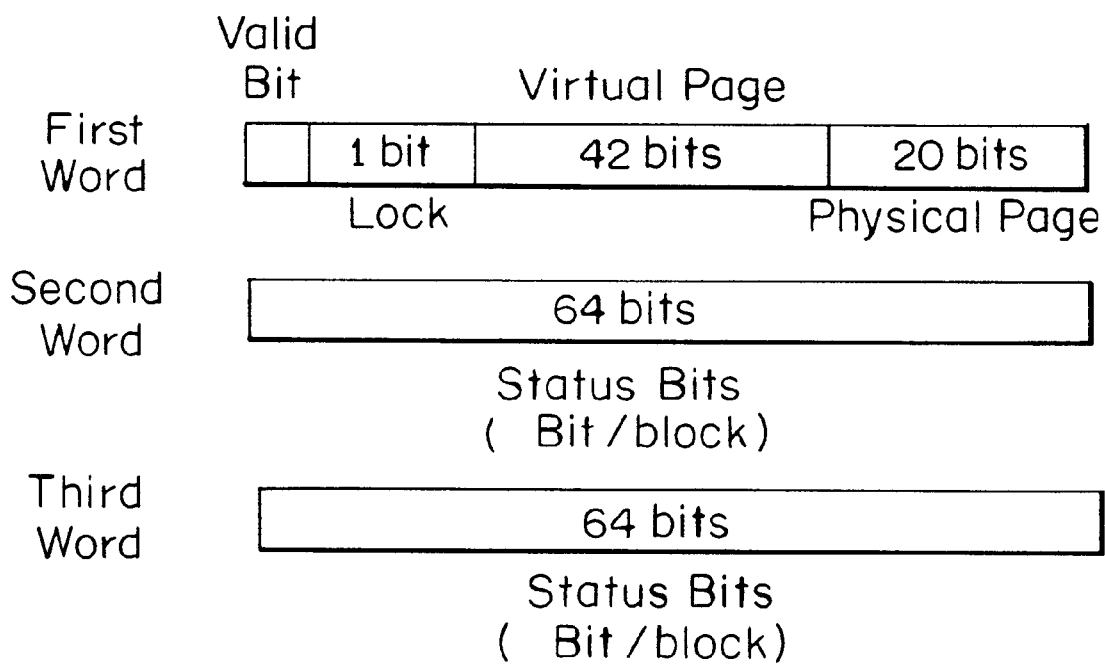
FIG. 9 illustrates an LTLB entry having block status bits in accordance with the present invention.
Figure 10:
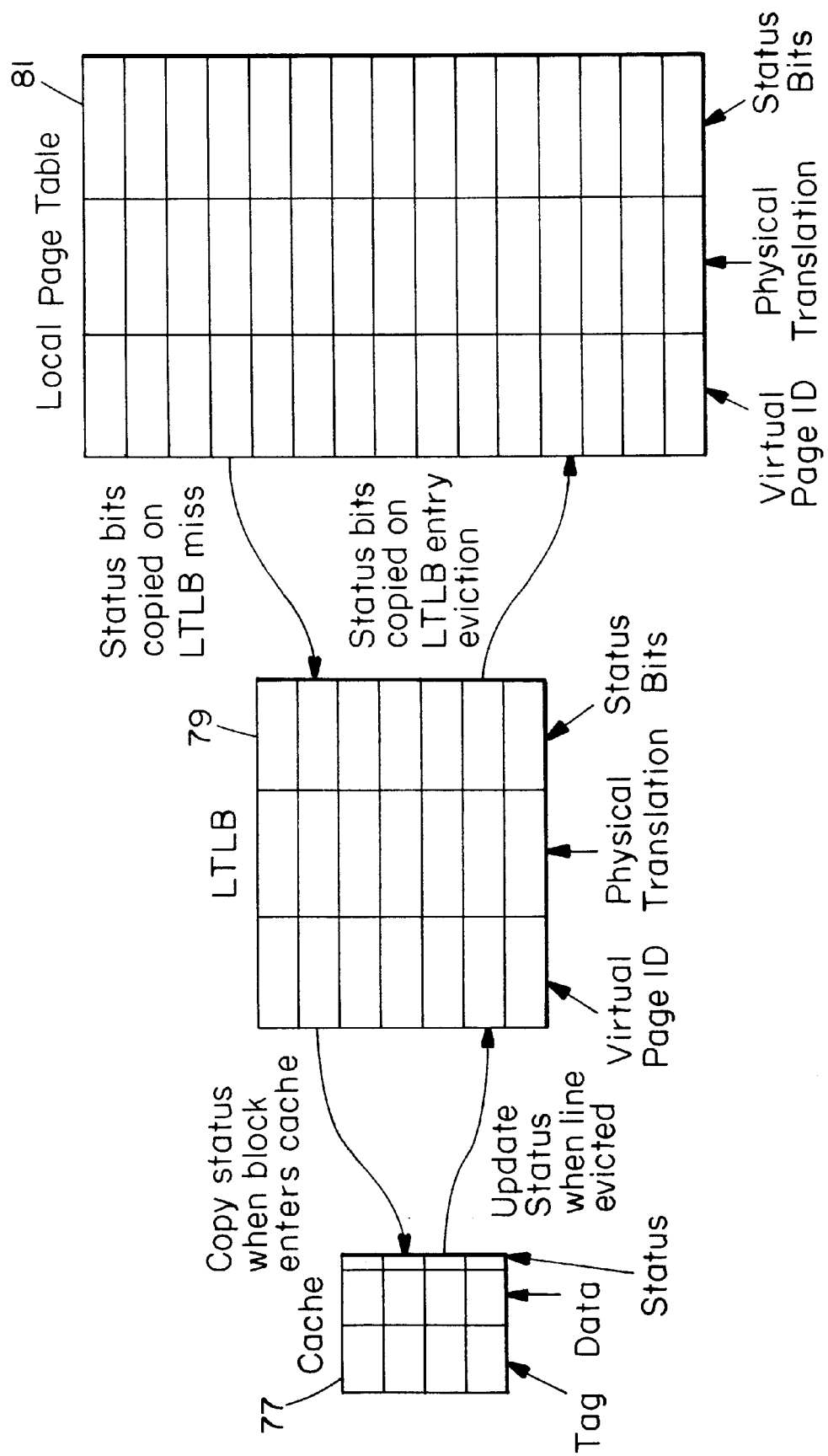
FIG. 10 illustrates status bit caching in a system using block status bits.
Figure 11:
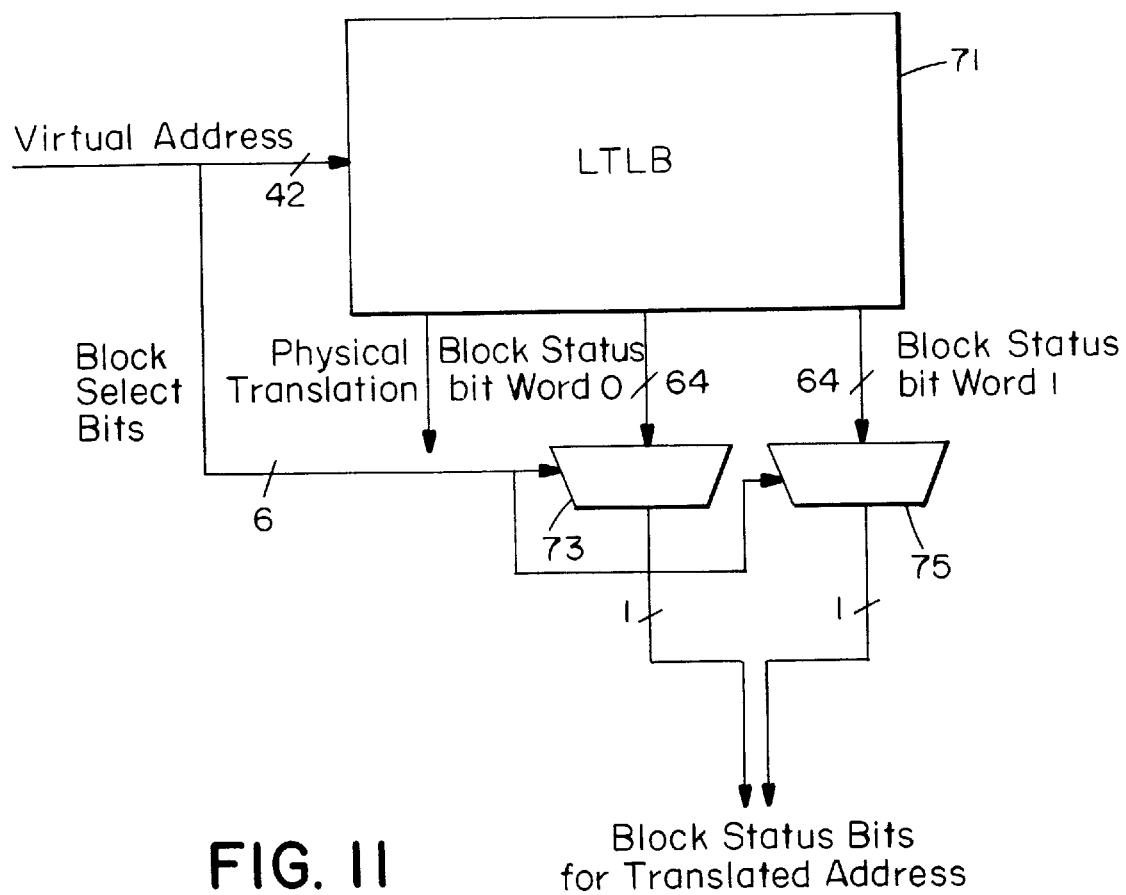
FIG. 11 is a block diagram of hardware utilized in determining status bits for a block in the LTLB.
Figure 12:
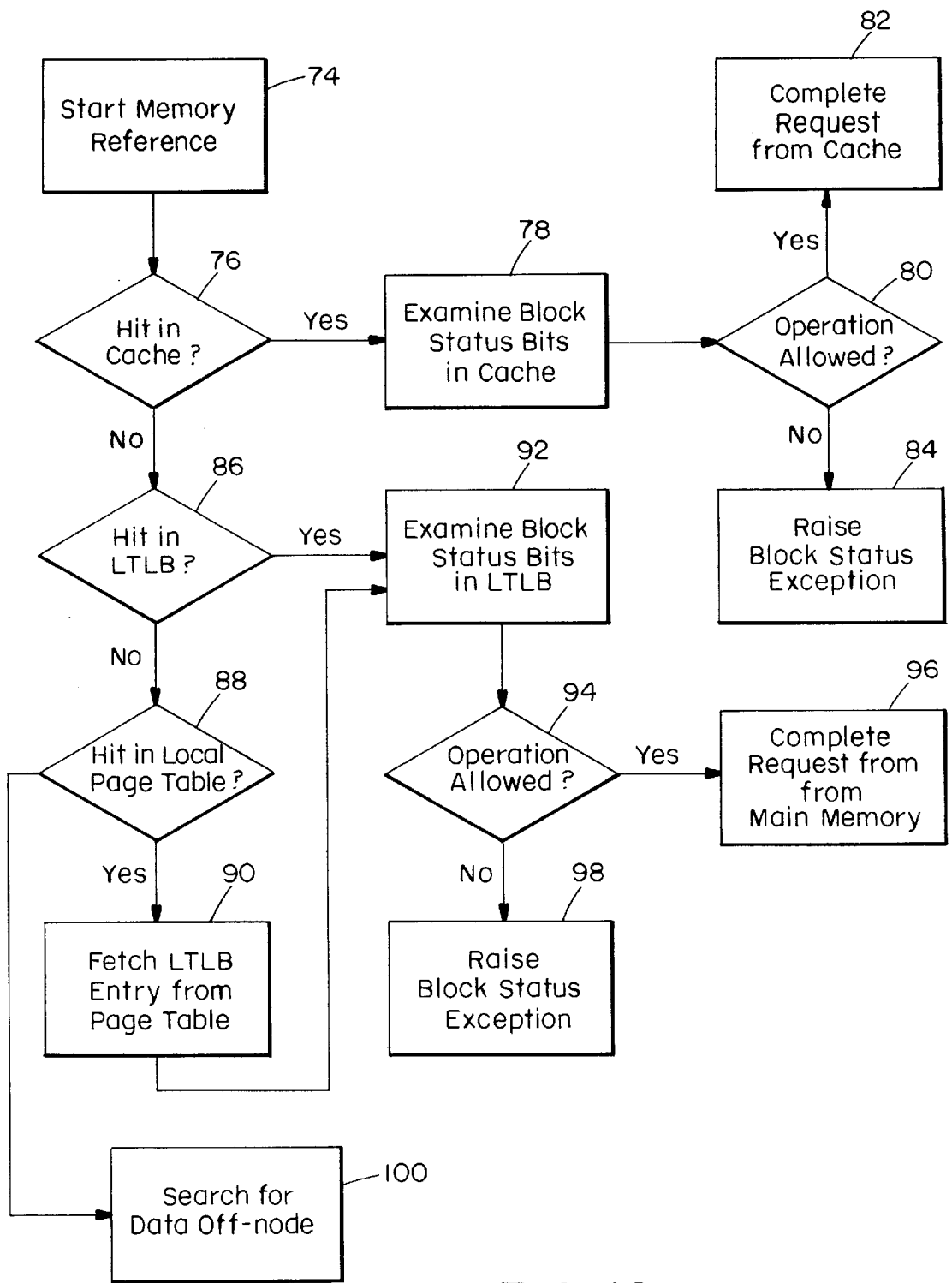
FIG. 12 is a flow chart of a memory request in a system that includes block status bits.

FIG. 9 shows the format of an LTLB entry, while FIG. 10 shows the transfers of status bits between storage locations, FIG. 11 shows the hardware that extracts the status bits for a block from the LTLB, and FIG. 12 is a flow chart of a memory request using the block status bits.

As shown in FIG. 9, an entry for each virtual page in the local page table and local table lookup buffer comprises three words. The first word includes the translation from virtual page to physical page. The virtual page is identified by the first 42 bits of the 54-bit virtual address. Since the translation to physical address is only for the physical space on a particular node, 20 bits are sufficient to identify the physical page location. The second and third words each include a single bit for each of 64 blocks of the virtual page.

As shown in FIG. 11, the first 42 bits of the virtual address are used to locate the page table entry n the LTLB 71 and three words for that entry are output as shown. To select the appropriate block status bits, the next 6 bits of the virtual address, which are the first 6 bits of the page offset, are applied to the select inputs of multiplexers 73 and 75, each selecting one of the two block space bits for that virtual address.

Caching the block status bits in the LTLB and in the cache allows the memory system to examine a word's block status bits when that word is referenced without requiring a page table access on each memory reference. FIG. 12 shows the sequence of events involved in performing a memory access in a system that implements block status bits. First (not shown on the flow chart) any permission checks that are necessary to determine whether or not the user is allowed to access the address in question are performed. This includes all of the procedures of FIG. 2A if the system incorporates Guarded Pointers.

Once that has been done, the request is submitted at 74 to the cache memory 77 (FIG. 10). If the address is found in the cache at 76, the block status bits corresponding to the address are examined and compared to the operation being performed at 78 and 80. If the operation is allowed, the cache memory completes the operation at 82 and is ready for the next request. If the operation is not allowed, an exception is raised at 84.

If the address is not in the cache 76, the local translation lookaside buffer (LTLB) 79 is probed at 86 to determine if it contains a translation for the address. If the LTLB does not contain a translation, an exception occurs at 88 to check the local page table 81, and software is invoked at 90 to load a translation into the LTLB from the local page table. As shown in FIG. 10, the LTLB entry which is evicted carries with it status bits for updating those bits in the local page table. Similarly, the new entry carries the status bits from the local page table. When the data is read into the cache memory 77, the status bits for the cache line are copied from the associated entry of the LTLB, with the exception that a dirty entry is entered in the cache as a read/write. The dirty designation is retained in the LTLB for purposes of providing the dirty flag to a home node when requested. However, the operating program which loads from the cache need only determine whether it is authorized to read or write. Within the cache, the status bit will be converted to dirty with a write to cache in order to facilitate updating the status bits in the LTLB and the data in memory with later eviction of the cache line.

Once a translation has been found, either in the page table or the LTLB, the block status bits corresponding to the address are compared at 92 and 94 to the operation being performed. If the block status bits allow the operation being attempted, the operation is completed from the main memory at 96. If the block status bits do not allow the operation, an exception is raised at 98.

If no translation for the address can be found in either the LTLB or the local page table, the software attempts at 100 to locate the data on another node, possibly using a GTLB as described below.

The operating system must have the ability to change the status bits of a memory block. This can be provided either through privileged operations that probe the cache to change the status bits in the cache as well as in the LTLB entry, or by requiring the system to remove the appropriate block from the cache before altering its status bits, and to ensure that the block is not returned to the cache before the status bits have been updated.

These states allow a variety of relocation and replication (cache coherence) schemes to be implemented efficiently, by handling the common case (the user attempting an access which is allowed) in hardware while giving the software the ability to determine how illegal accesses are handled. For example, block status bits allow the efficient implementation of a system in which small data objects are relocated from node to node. When a data object is brought onto a node, a page table entry is created for the page containing that object if one does not already exist. The status bits for the memory blocks containing the object being relocated are set to one of the three valid states, while the status bits for each memory block that does not contain valid data on the local node are set to INVALID. Users can then access the object in any way that is consistent with the status bits associated with it. If a user attempts to reference a block that has not been brought on to the local node, its status bits will be in the INVALID state, and any attempt to reference it will cause an exception, invoking an exception handler to resolve the situation. Moving an object off of a node can be accomplished by copying it to another node, and changing the status bits associated with it to INVALID, prohibiting access to the object. This allows small data objects to be relocated throughout a multicomputer efficiently without requiring overly large tables to contain information about which objects are located on a given node. The system will have to maintain a table in software which contains information on where each object is in the system, but the space constraints on software tables are not nearly as great as on hardware tables.

Block status bits can also be used to implement cache coherence schemes. Many cache-coherence schemes assign states to data which are very similar to the block status states: INVALID, READ-ONLY, READ-WRITE, and DIRTY. The differences between these schemes lie in their handling of cases where data is referenced in a manner which is inconsistent with its state. Block status bits allow the hardware to handle the (common) case where data is accessed in an allowed manner, with software being invoked to handle the uncommon case where an illegal access is attempted. Since system software can manipulate the status bits of a block, operations such as system-wide invalidation of a block so that one node can gain an exclusive copy of the block, can be efficiently implemented.

Global Translation Lookaside Buffer

A Global Translation Lookaside Buffer (GTLB) is used to cache translations between virtual addresses and the nodes containing those addresses. Translation of virtual addresses to physical addresses is handled by a Local Translation Lookaside Buffer (LTLB) which may essentially be the same as a conventional translation lookaside buffer. The intended use of the GTLB is to allow hardware and software to quickly determine which node of a multicomputer contains a given datum. A message can then be sent to that node to access the datum. On the node that contains the datum, the LTLB can be used to translate the virtual address into a physical address in order to reference the datum.

In order to allow large blocks of virtual address space to be mapped by a small number of GTLB entries without increasing the size of the smallest block of data that can be mapped, each GTLB entry maps a variable-sized page-group of virtual address space across a number of nodes. In order to simplify the interaction between the local and global translation mechanisms, and to reduce the number of bits required to encode the length of a page-group, each page group must be a power of two local pages in length.

The address space contained in a page-group may be mapped across a 3-D sub-cube of nodes, with the following restrictions: each side of the sub-cube must be a power of two nodes long, and the amount of address space allocated to each node must be a power of two local pages. While these restrictions constrain the mapping of address space to nodes somewhat, they greatly reduce the size of the GTLB entry and the complexity of the hardware needed to perform the translation.

Figure 13:
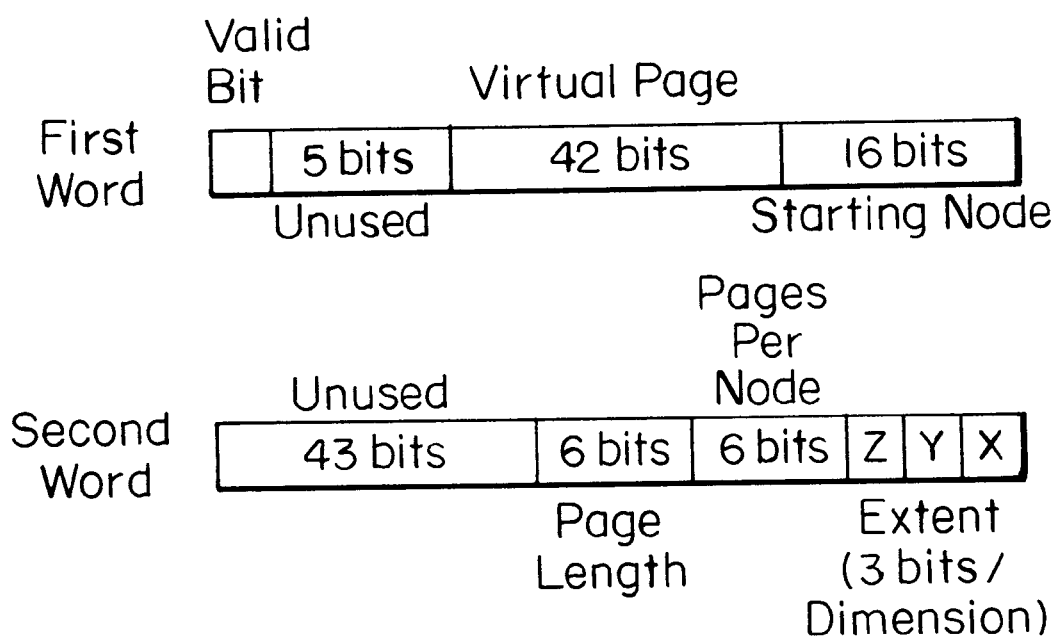
FIG. 13 is an illustration of a GTLB entry in a system using global translation in accordance with the present invention.

FIG. 13 shows the format of a GTLB entry. 42 bits encode the virtual page identifier, which is obtained by truncating the low 12 bits off a 54-bit virtual address, since these bits represent the offset within a local page. Sixteen bits encode the start node of the sub-cube of nodes that the page-group maps across. This node ID is divided into a six-bit Z-Coordinate, and 5-bit X- and Y-coordinates to give the position of the start node within the machine. Six bits encode the base-2 logarithm of the length of the page-group in local pages. Six bits encode the base-2 logarithm of the number of local pages of address space to be placed on each node. Three bits encode the base-2 logarithm of the length of the prism of nodes that the page-group maps across in each of the X-, Y-, and Z-dimensions.

Figure 14A:
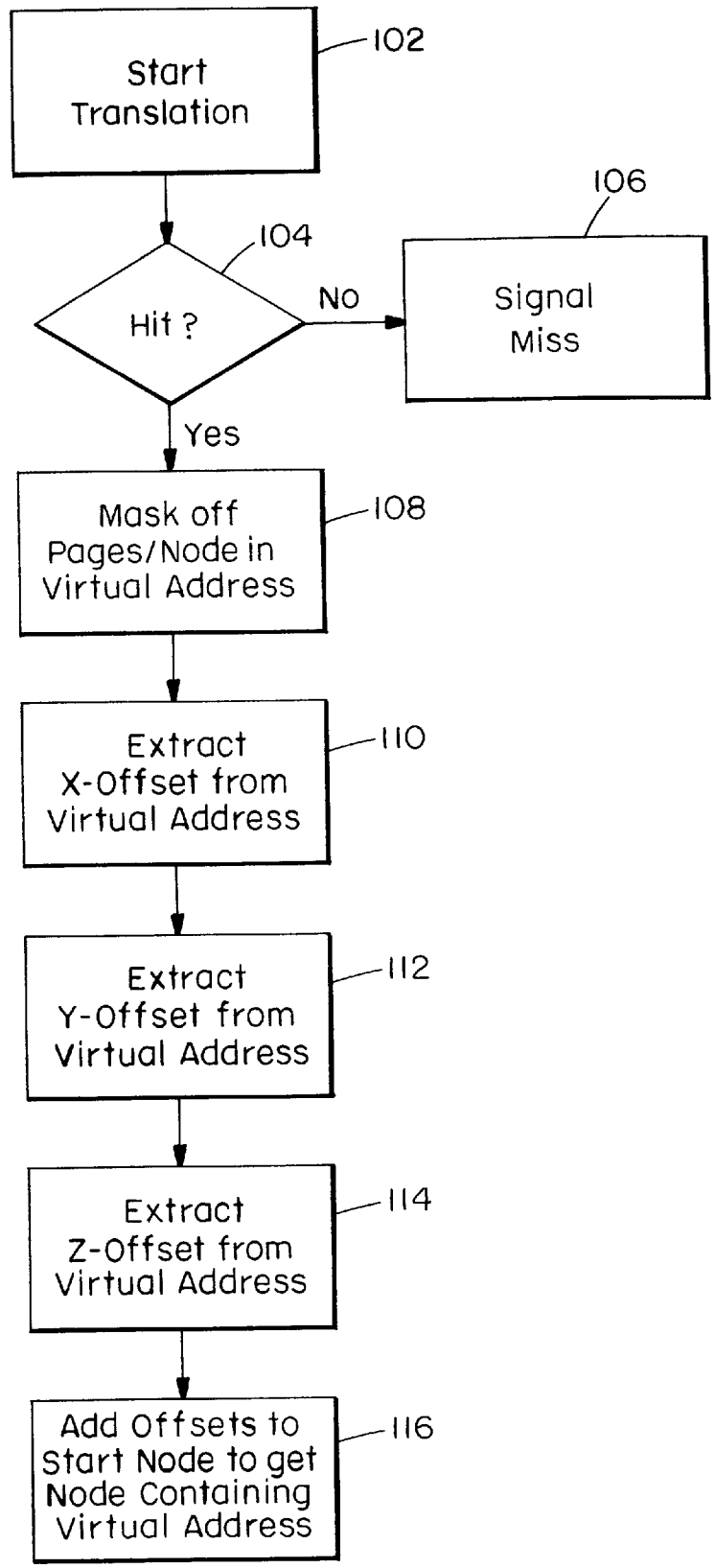
FIG. 14A is a flow chart of a GTLB translation process.
Figure 14B:
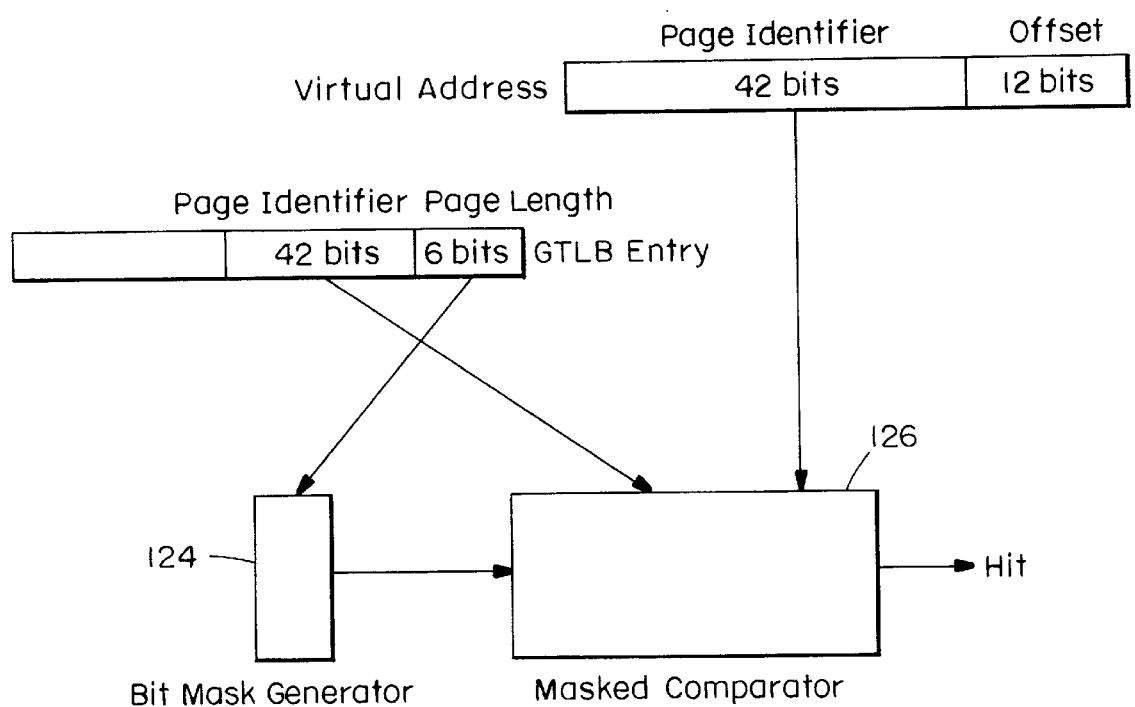
FIG. 14B illustrates a masked comparator used in the GTLB.
Figure 15A:
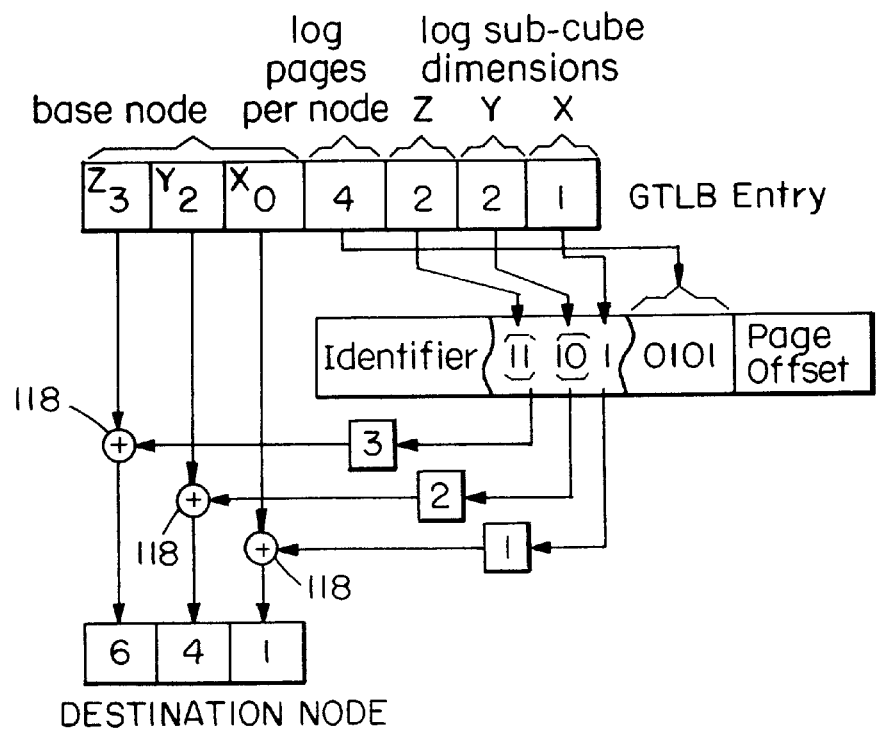
FIG. 15A illustrates an example GTLB translation of an address.

FIGS. 14A, 14B, 15A and 15B show the manner in which the GTLB translates a virtual address. The virtual address is submitted to the GTLB at 102. If a hit is not located at 104, a miss is signalled at 106 to call an exception which reads the global page table. FIG. 15A illustrates an example GTLB entry located with a hit.

Since the GTLB is fully associative, the page identifier portion of each virtual address, that is, the first 42 bits of each virtual address, must be compared to the virtual page identifier of each entry in the GTLB. Further, since the grouping of pages allows for a single GTLB entry for each page group, the least significant bits of the page identifier corresponding to the number of pages in the group need not be considered in the comparison. Thus, as illustrated in FIG. 14B, the six bits of each GTLB entry which indicate the number of pages per group can be decoded to create a mask in bit mask generator 124. Using the bit mask generator 124, only the more significant bits of the page identifiers required to identify a group are compared in the mask comparator 126. On the other hand, the full 42 bits of both the virtual address and the GTLB entry are applied to the comparator since groups can be of different lengths and thus require masking of different sets of bits. Applying the full 42 bit identifiers to the comparator allows for a group of only one page.

Figure 15B:
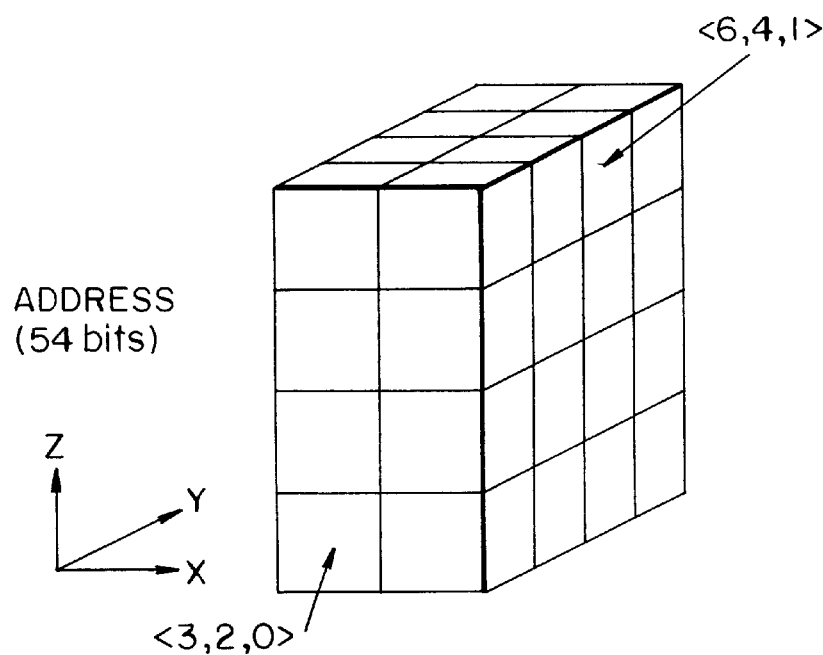
FIG. 15B illustrates the node within a group identified by the translation of FIG. 15A.

From the entry illustrated in FIG. 15A, it is determined that the start node of the sub-cube is node [3,2,0] and that $2^4$ pages of address space are mapped to each node within the sub-cube. The page-group is mapped across a sub-cube of nodes that extends 22 nodes in the Z-direction, 22 nodes in the Y-direction, and 2 nodes in the X-direction. The start node [3,2,0] and the full cubic group of nodes is illustrated in FIG. 15B.

To determine the node containing the address being translated, the GTLB masks off at 108 the page offset bits of the address which contain the offset from the start of the local page to the address being translated. The next four bits of address 0101 are discarded, as they all map to the same node, as shown by the value 4 in the "log pages per node" filed. The next bit of the address contains the X-offset from the start node to the node containing the address, as shown by the value of 1 in the X subfield of the "log sub-cube dimensions" field, and that bit is extracted at 110. Similarly, two bits contain the Y-offset and two bits contain the Z-offset from the start node to the node containing the address being translated, and those are extracted at 112 and 114. Examining the selected bit fields reveals that the node containing the address lies at offset X=1, Y=2, Z=3 from the start node. Adding these values to the coordinates of the start node at 116 in the address 118 gives the coordinates of the node containing the address X=1, Y=4, Z=6, shown in FIG. 15B.

Figure 16:
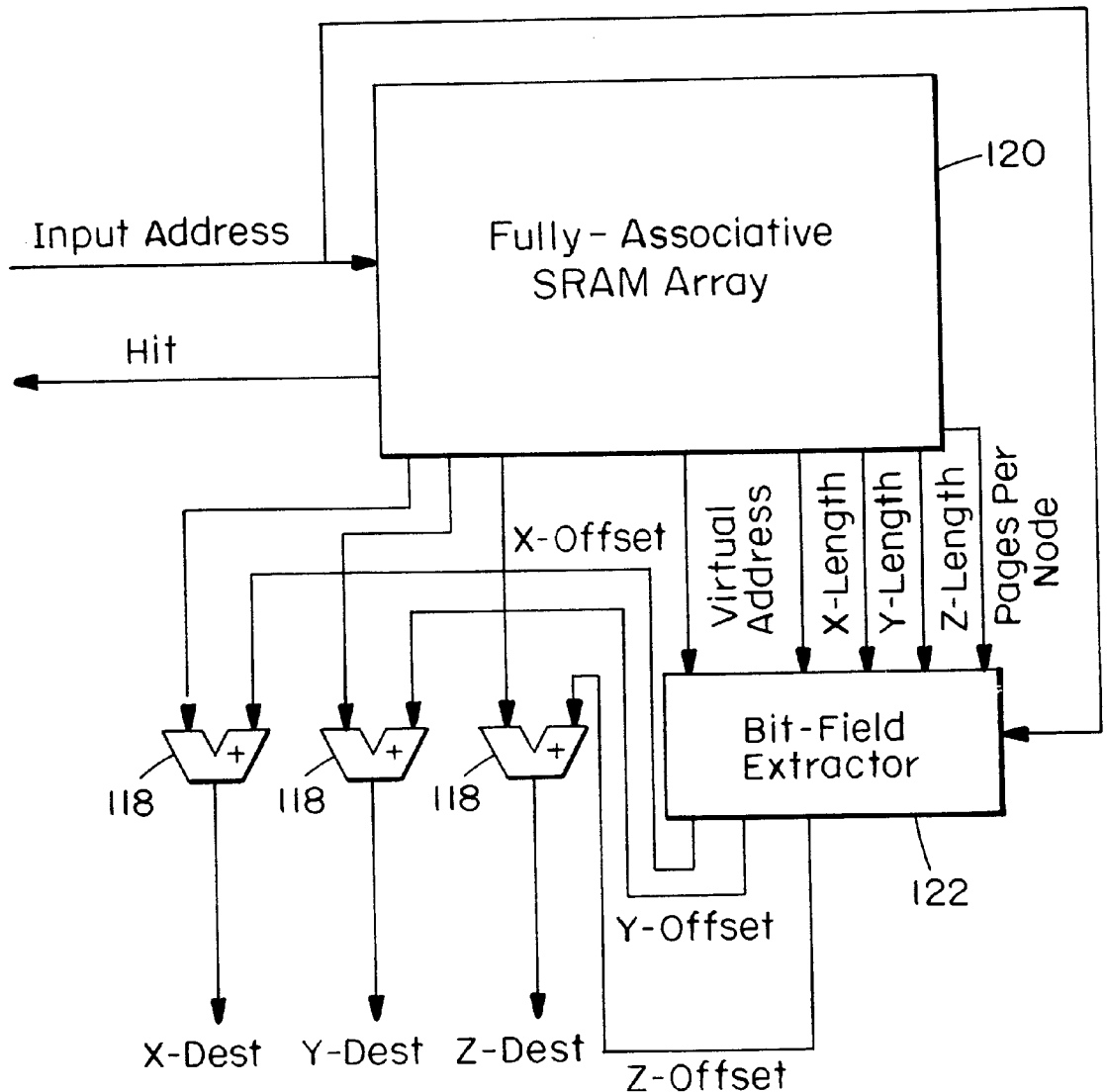
FIG. 16 is a block diagram of a GTLB.

FIG. 16 shows a block diagram of the GTLB hardware. The GTLB comprises a content addressable memory CAM 120 which contains the GTLB entries, a bit-field extractor 122 to extract the X-, Y-, and Z-Offset fields from the source address, and three adders 118 to add the offsets to the appropriate portions of the start node. The SRAM array must be fully-associative, as the variable size of page-groups makes it impossible to use a fixed number of bits to select a set within the array to be searched. When an address is submitted to the GTLB for translation, it is passed to the CAM array. If the address is found in the array, the Hit output is asserted, and the start node, the page-group length, the pages-per-node information, and the X-, Y-, and Z-lengths of the sub-cube of nodes containing the address being translated are outputted. The bit-field extractor takes the dimension of the prism, and the page-length and pages-per-node information, and extracts from the virtual addresses the bit fields containing the X-, Y-, and Z-offsets from the start node of the page-group to the node containing the address being translated. The offsets are then added to the appropriate field within the address of the start node to get the address of the node containing the address.

Integration of all Three Systems

Figure 17:
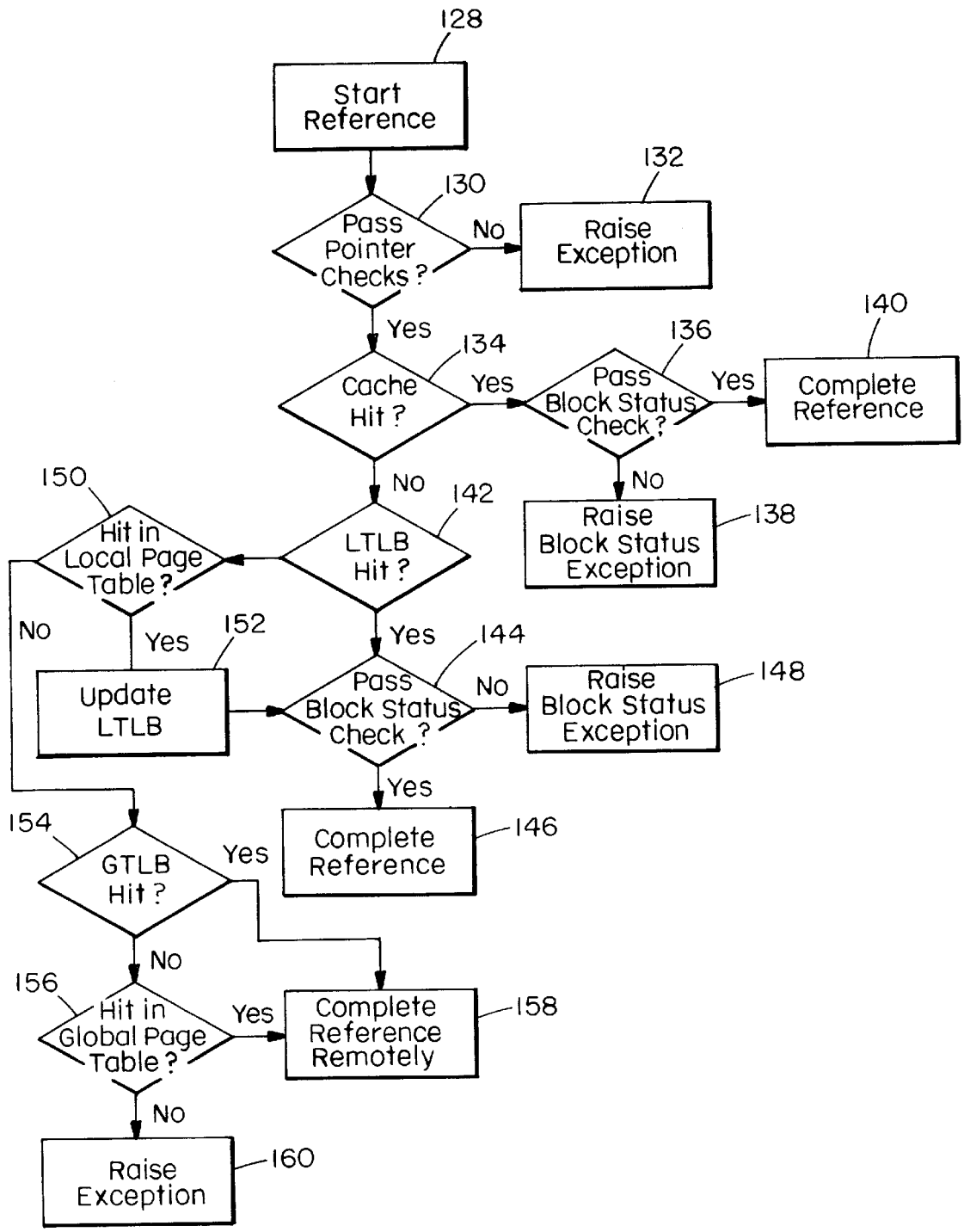
FIG. 17 is a flow chart of a memory request in a system that includes guarded pointers, block status bits, and a GTLB.

FIG. 17 shows a flow chart of the execution of a memory reference from 128 in a system that combines Guarded Pointers, Block Status Bits, and a Global Translation Lookaside Buffer. The first step in performing a memory operation is to perform at 130 the pointer permission checks described in the section on Guarded Pointers. If those checks pass, the memory request is sent to the memory system. Otherwise, an exception is raised at 132.

If the data is located in the cache at 134, its block status bits are examined at 136, and an exception is raised at 138 if they do not allow the operation being attempted. Otherwise, the operation is completed in the cache at 140. If the data is not located in the cache, the LTLB is probed at 142 for a translation for the address. If a translation is found, the block status bit of the address are examined at 144, and the operation completed from the main memory at 146 if the status bits allow it, or an exception raised at 148 if they do not.

If a translation for the address is not found in the LTLB at 142, software searches the local page for a translation at 150. If a translation is found, the LTLB is updated at 152 to contain the translation, and the reference proceeds at 144 as if an LTLB hit occurred.

If no translation is found in the local page table at 150, the software probes the GTLB at 154 to see if the node containing the address can be determined. If a GTLB miss occurs, the global page table is searched at 156 for an entry corresponding to the address. If the node containing the address can be located either through the GTLB or the global page table, the software can send a message to that node to complete the request at 158. Otherwise, an error is signalled at 160, as the reference can not be completed.

While each of these mechanisms is useful separately, they complement each other to form the basis for the memory system of a multicomputer. Guarded Pointers provide a protection mechanism that allows a number of independent processes to share the resources of the multicomputer without compromising the security of those processes. The Global Translation Lookaside Buffer provides an effective mechanism for distributing data objects across the multicomputer by mapping virtual addresses to nodes within the multicomputer. The block Status Bits make the process of moving or copying data from node to node more efficient by reducing the size of the smallest datum that can be relocated, without increasing the number of translation table entries required if no remote data is accessed.

A related paper has been submitted for presentation at the 6th International Conference on Architectural Support for Programming Languages and Operating Systems (ASPLOS VI), Oct. 5–6, 1994.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. In a parallel processing system, a method of addressing data across plural processor nodes comprising:

applying a virtual address to a global translation buffer to identify a mapping of a page group of plural pages across a set of plural but less than all processor nodes in the system, the page group containing the physical page to which the virtual address corresponds; and from the virtual address and mapping, determining a destination node as a node within the set of processor nodes which contains the physical page to which the virtual address corresponds.

2. A method as claimed in claim 1 further comprising forwarding a message to the destination node.

3. A method as claimed in claim 2 further comprising, at the destination node, translating the virtual address to a physical address.

4. A method as claimed in claim 1 wherein each page group is specified by a group size.

5. A method as claimed in claim 4 wherein the group size is logarithmically encoded.

6. A method as claimed in claim 1 wherein the translation buffer specifies a start node and the range of the set of nodes.

7. A method as claimed in claim 6 wherein the range is specified in plural dimensions.

8. A method as claimed in claim 7 wherein the range is logarithmically encoded in each of the plural dimensions.

9. A method as claimed in claim 8 wherein the translation buffer specifies the number of pages of the page group per node of the set of nodes.

10. A method as claimed in claim 6 wherein the translation buffer specifies the number of pages of the page group per node of the set of nodes.

11. A method as claimed in claim 1 wherein the translation buffer specifies the number of pages of the page group per node of the set of nodes.

12. A data processing system comprising a plurality of processor nodes, each processor node comprising:

a global translation buffer for identifying relative to a virtual address a mapping of a page group of plural pages to a set of plural processor node s in the system, the page group containing the physical page to which the virtual address corresponds;

electronics which determines, from the virtual address and the identified mapping, a destination node as a node within the set of processor nodes having the physical address corresponding to the virtual address.

* * * * *